United States Patent
Huang et al.

(10) Patent No.: US 12,140,912 B2
(45) Date of Patent: Nov. 12, 2024

(54) DISPLAY METHOD AND APPARATUS, INTELLIGENT WEARABLE DEVICE, AND STORAGE MEDIUM

(71) Applicant: Anhui Huami Information Technology Co., Ltd., Anhui FTZ (CN)

(72) Inventors: Wang Huang, Anhui FTZ (CN); Pengtao Yu, Anhui FTZ (CN); Kongqiao Wang, Anhui FTZ (CN)

(73) Assignee: Anhui Huami Information Technology Co., Ltd., Anhui FTZ (CN)

( * ) Notice: Subject to any disclaimer, the term of this patent is extended or adjusted under 35 U.S.C. 154(b) by 540 days.

(21) Appl. No.: 17/520,054

(22) Filed: Nov. 5, 2021

(65) Prior Publication Data
US 2022/0057758 A1    Feb. 24, 2022

Related U.S. Application Data

(63) Continuation of application No. PCT/CN2020/089207, filed on May 8, 2020.

(30) Foreign Application Priority Data

May 8, 2019   (CN) .......................... 201910381115.2

(51) Int. Cl.
 *G04G 21/02*   (2010.01)
 *G06F 1/16*    (2006.01)
 *G06F 3/01*    (2006.01)

(52) U.S. Cl.
 CPC .......... *G04G 21/025* (2013.01); *G06F 1/163* (2013.01); *G06F 1/1694* (2013.01); *G06F 3/014* (2013.01); *G06F 3/015* (2013.01); *G06F 3/017* (2013.01)

(58) Field of Classification Search
 None
 See application file for complete search history.

(56) References Cited

U.S. PATENT DOCUMENTS

2016/0018900 A1*  1/2016  Tu ..................... G06F 1/3218
                                                         345/156
2016/0070367 A1   3/2016  Lin
                        (Continued)

FOREIGN PATENT DOCUMENTS

CN   103809752 A   5/2014
CN   104698831 A   6/2015
             (Continued)

OTHER PUBLICATIONS

International Search Report for International Application No. PCT/CN2020/089207 mailed Aug. 11, 2020.

*Primary Examiner* — Nicholas J Lee
(74) *Attorney, Agent, or Firm* — Young Basile Hanlon & MacFarlane, P.C.

(57) ABSTRACT

A display method and apparatus, a wearable device, and a computer-readable storage medium. The method is applied to the wearable device. The wearable device comprises an inertial sensor and at least two screen display areas; when a user wears the wearable device, the screen display areas are not located on the same plane at the same time. The method comprises: obtaining a target action of a user by means of measurement data collected by the inertial sensor; determining the screen display area corresponding to a sight range of the user according to the target action of the user; and lighting the screen display area to display the current content.

20 Claims, 8 Drawing Sheets

Screen display area at the top of the wrist

Screen display area at the bottom of the wrist

(56) References Cited

U.S. PATENT DOCUMENTS

| | | | | |
|---|---|---|---|---|
| 2016/0143079 A1* | 5/2016 | Yoon | ................... | H04W 8/005 |
| | | | | 455/41.1 |
| 2017/0038845 A1* | 2/2017 | Chi | ......................... | G06F 3/16 |
| 2017/0090590 A1* | 3/2017 | Shimotono | ............ | G04G 21/00 |
| 2018/0348823 A1* | 12/2018 | Kong | ..................... | H05K 1/189 |
| 2020/0004313 A1* | 1/2020 | Kelley | ................... | G06F 1/325 |

FOREIGN PATENT DOCUMENTS

| | | |
|---|---|---|
| CN | 104850317 A | 8/2015 |
| CN | 106020670 A | 10/2016 |
| CN | 106055097 A | 10/2016 |
| CN | 106293072 A | 1/2017 |
| CN | 106446728 A | 2/2017 |
| CN | 106814808 A | 6/2017 |
| CN | 107132880 A | 9/2017 |
| CN | 110187759 A | 8/2019 |
| CN | 110850988 A | 2/2020 |

* cited by examiner

DISPLAY METHOD AND APPARATUS, INTELLIGENT WEARABLE DEVICE, AND STORAGE MEDIUM

CROSS-REFERENCE TO RELATED APPLICATION(S)

The present application is a continuation of International (PCT) Patent Application No. PCT/CN2020/089207 filed on May 8, 2020, which claims priority to Chinese Patent Application No. 201910381115.2 filed on May 8, 2019, the contents of both of which are hereby incorporated by reference in their entireties.

TECHNICAL FIELD

The present disclosure relates to the technical field of wearable devices, and in particular, to a display method and apparatus, an intelligent wearable device, and a computer-readable storage medium.

BACKGROUND

With the development of wearable technologies, wearable devices, such as bracelets, watches, armbands, or wristbands, are playing an increasingly important role in people's mobile life, and the consequent demand for "reversed transmission of the pressure" is also vigorously promoting the further development of wearable technology. This is reflected not only in new sensor technologies and biometric algorithms, but also in the interaction of wearable devices.

From an application point of view, wearable devices are currently mainly used in subdivided fields such as sports and health. In addition, there is a growing demand for wearable devices with communication functions in the mobile market recently. Therefore, a wearable device is generally provided with a corresponding screen, which can provide the function of displaying or executing corresponding content based on a user's touch operation, thereby achieving the interaction with the user.

However, the screen of the wearable device in the related art is often disposed at a fixed position of the wearable device. When the user wants to view any content on the wearable device and if the current screen is not within a sight range of the user, the user needs to manually adjust the screen of the wearable device to be within the sight range to operate, which affects the use experience of the user.

SUMMARY

Implementations of the present disclosure provide a display method and apparatus, a wearable device, and a computer-readable storage medium.

According to a first aspect of the implementations of the present disclosure, a display method is provided, wherein the method is applied to a wearable device, and the wearable device includes an inertial sensor and at least two screen display areas; the display method includes obtaining a target action of a user based on measurement data collected by the inertial sensor; determining the screen display area corresponding to a sight range of the user according to the target action of the user; and turning on lighting of the screen display area to display current content, wherein when the user wears the wearable device, the at least two screen display areas are not located on the same plane simultaneously.

Optionally, the measurement data includes acceleration data and angular velocity data in three axis directions in a three-dimensional coordinate system.

Optionally, the acceleration data includes X-axis acceleration data, Y-axis acceleration data, and Z-axis acceleration data, and the angular velocity data comprises X-axis angular velocity data, Y-axis angular velocity data, and Z-axis angular velocity data.

Optionally, the obtaining the target action of the user based on measurement data collected by the inertial sensor includes: obtaining a wrist raising action of the user according to the acceleration data in the three axis directions in the three-dimensional coordinate system measured by the inertial sensor.

Optionally, the determining the screen display area corresponding to the sight range of the user according to the target action of the user includes: determining a direction of the wrist raising action according to the z-axis acceleration data or the y-axis angular velocity data to determine the screen display area corresponding to the sight range of the user.

Optionally, the obtaining the wrist raising action of the user according to the acceleration data in the three axis directions in the three-dimensional coordinate system measured by the inertial sensor includes: calculating an acceleration modulus value according to the acceleration data in the three axis directions in the three-dimensional coordinate system measured by the inertial sensor to determine the wrist raising action, the acceleration modulus value being mth power of a sum of nth power of the acceleration data in the three axis directions, and m and n being not equal to 0.

Optionally, the obtaining the target action of the user based on measurement data collected by the inertial sensor includes: obtaining a wrist turnover action of the user based on the x-axis angular velocity data in the three-dimensional coordinate system measured by the inertial sensor.

Optionally, the obtaining the wrist turnover action of the user based on the x-axis angular velocity data in the three-dimensional coordinate system measured by the inertial sensor includes: in response to the x-axis angular velocity data in the three-dimensional coordinate system measured by the inertial sensor being greater than a specified threshold, determining the wrist turnover action.

Optionally, the determining the screen display area corresponding to the sight range of the user according to the target action of the user includes: determining a turnover direction of the wrist turnover action according to the z-axis acceleration data to determine the screen display area corresponding to the sight range of the user.

Optionally, the determining the turnover direction of the wrist turnover action according to the z-axis acceleration data includes: obtaining the z-axis acceleration data within a preset time period; calculating an average value of a first half of the z-axis acceleration data and an average value of a second half of the z-axis acceleration data in the preset time period; and determining the turnover direction of the wrist turnover action according to signs of the average value of the first half of the z-axis acceleration data and the average value of the second half of the z-axis acceleration data, and a magnitude relation between a difference of the two average values and a preset threshold, where the signs of the average value of the first half and the average value of the second half of the z-axis acceleration are related to a value of an included angle formed by a z-axis direction and a direction of gravitational acceleration.

Optionally, in response to the included angle formed by the z-axis direction and the direction of gravitational acceleration being less than 90, a z-axis acceleration value is negative; in response to the included angle formed by the z-axis direction and the direction of gravitational acceleration being equal to 90, the z-axis acceleration value is 0; and in response to the included angle formed by the z-axis direction and the direction of gravitational acceleration being greater than 90, the z-axis acceleration value is positive; where the determining the turnover direction of the wrist turnover action according to signs of the average value of the first half of the z-axis acceleration data and the average value of the second half of the z-axis acceleration data, and the magnitude relation between the difference of the two average values and a preset threshold includes: in response to the average value of the first half of the z-axis acceleration data being positive, the average value of the second half being negative, and an absolute difference value between the first half and the second half being greater than the preset threshold, determining that the wrist turnover action is turning to a direction in which the palm of the user faces down; and in response to the average value of the first half of the z-axis acceleration data being negative, the average value of the second half being positive, and the absolute difference value between the first half and the second half being greater than the preset threshold, determining that the wrist turnover action is turning to a direction in which the palm of the user faces up.

Optionally, the display method further including: determining a display direction of the current content according to the target action, the display direction being a horizontal direction or a vertical direction; and adjusting the current content based on the display direction.

Optionally, the obtaining the target action of the user based on measurement data collected by the inertial sensor includes: obtaining a wrist turning action of the user according to the z-axis angular velocity data in the three-dimensional coordinate system measured by the inertial sensor.

Optionally, the obtaining the wrist turning action of the user according to z-axis angular velocity data in the three-dimensional coordinate system measured by the inertial sensor includes: in response to the z-axis angular velocity data in the three-dimensional coordinate system measured by the inertial sensor being greater than a preset threshold, determining the wrist turning action. The determining the display direction of the current content according to the target action includes: determining a direction of the wrist turning action according to the x-axis acceleration data and the y-axis acceleration data to determine the display direction of the current content.

Optionally, the determining the turnover direction of the wrist turning action according to the x-axis acceleration data and the y-axis acceleration data includes: obtaining the x-axis acceleration data and the y-axis acceleration data within a preset time period; respectively calculating average values of first halves and average values of second halves of the x-axis acceleration data and the y-axis acceleration data in the preset time period; and determining the direction of the wrist turning action according to signs of the average values of the first halves and the average values of the second halves of the x-axis acceleration data and the y-axis acceleration data, a magnitude relation between a difference of the two average values of the x-axis acceleration data and a preset threshold, and a magnitude relation between a difference of the two average values of the y-axis acceleration data and the preset threshold, where the signs of the average value of the first half and the average value of the second half of the x-axis acceleration are related to a value of an included angle formed by an x-axis direction and a direction of gravitational acceleration, and the signs of the average value of the first half and the average value of the second half of the y-axis acceleration are related to a value of an included angle formed by a y-axis direction and the direction of gravitational acceleration.

According to a second aspect of the implementations of the present disclosure, a wearable device is provided, including: a processor; a storage configured to store instructions executable by the processor; and an inertial sensor and at least two screen display areas; wherein the inertial sensor is configured to collect measurement data; and the processor is configured to perform operations in the method as stated above.

According to a third aspect of the implementations of the present disclosure, a non-transitory computer-readable storage medium having a computer program stored thereon is provided, which, when executed by one or more processors, causes the processors to perform operations in the method as stated above.

The technical solutions provided in the implementations of the present disclosure may include the following beneficial effects:

In the present disclosure, the wearable device is provided with at least two screen display areas, so that after obtaining the target action of the user based on the measurement data of the inertial sensor, the wearable device can determine the screen display area corresponding to the sight range of the user according to the target action of the user, and then light the screen display area to display the current content. A process of automatically determining and lighting the screen display area corresponding to the sight range of the user is achieved, without the need for the user to manually adjust the position of the screen, so that the user experience of the user is further improved.

It should be understood that the foregoing general description and the following detailed description are merely example and explanatory, and are not intended to limit the present disclosure.

BRIEF DESCRIPTION OF DRAWINGS

The accompanying drawings here, which are incorporated into the specification and constitute a part of the specification, illustrate implementations that conform to the present disclosure and are used together with the specification to explain the principles of the present disclosure.

DETAILED DESCRIPTION

Figure 1:
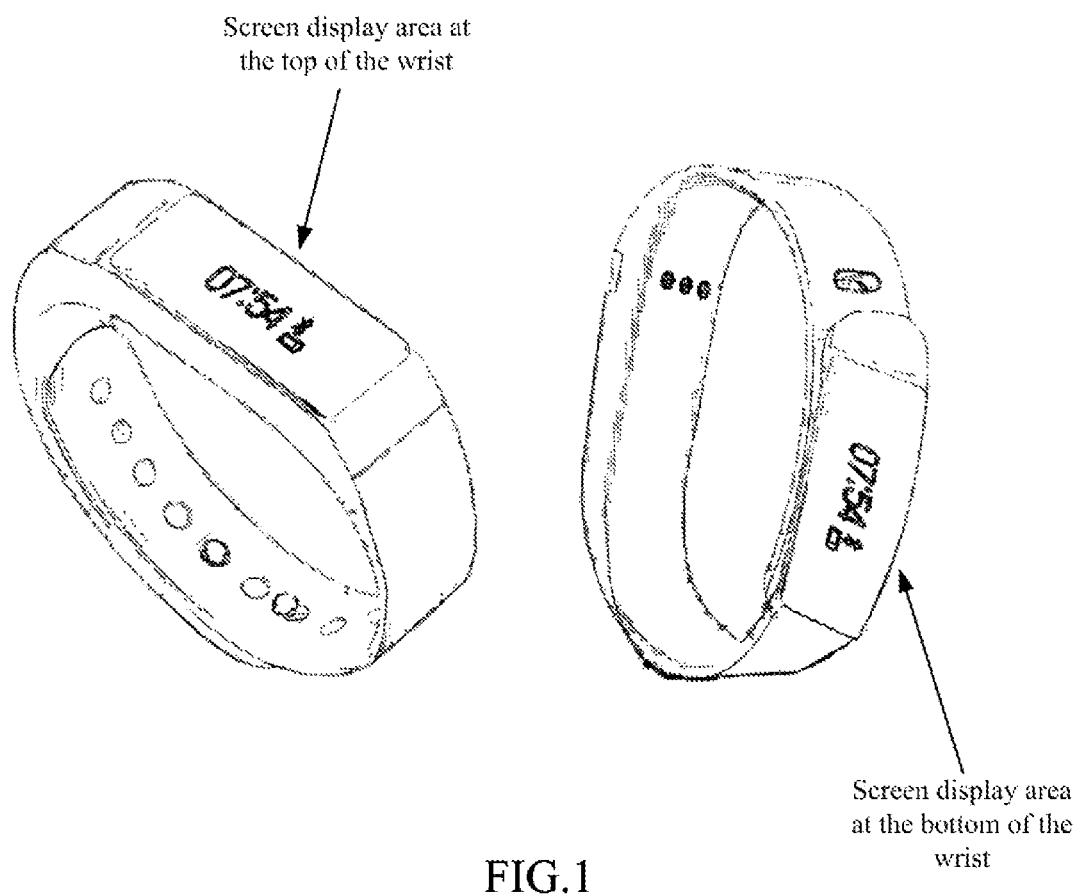
FIG. 1 is an electrocardiogram of a wearable device provided with two screen display areas according to an example implementation of the present disclosure.

Example implementations will be described here in detail, and examples thereof are represented in the accompanying drawings. When the following description relates to the accompanying drawings, unless otherwise indicated, the same numbers in different accompanying drawings represent the same or similar elements. The implementations described in the following example implementations do not represent all implementations consistent with the present disclosure. Conversely, they are merely examples of apparatuses and methods consistent with some aspects of the present disclosure as detailed in the appended claims.

Terms used in the present disclosure are merely for describing specific implementations and are not intended to limit the present disclosure. The singular forms "a," "said," and "the" used in the present application and the appended claims are intended to include the plural form, unless the context clearly indicates otherwise. It should also be understood that the term "and/or" used herein refers to and includes any or all possible combinations of one or more associated listed terms.

It should be understood that although terms "first," "second," "third," and the like may be used in the present disclosure to describe various information, the information should not be limited to these terms. These terms are only used for distinguishing information of the same type. For example, without departing from the scope of the present disclosure, first information may also be referred to as second information, and similarly the second information may also be referred to as the first information. Depending on the context, for example, the word "if" used herein may be explained as "while" or "when" or "in response to determining."

The screen of a wearable device in the related art is usually disposed at a fixed position of the wearable device, when a user wants to view any content from the wearable device, if the current screen is not within a sight range of the user, the user needs to manually adjust the screen of the wearable device to be within the sight range to operate, which affects the use experience of the user.

Therefore, to solve the problems in the related art, implementations of the present disclosure provide a display method, which can light (i.e., turning on lighting of) a screen display area corresponding to a sight range of a user based on the action of the user. The display method in the implementations of the present disclosure may be applied to a wearable device. The wearable device may be a device worn on an upper limb, such as a bracelet, a watch, a wristband, an armband, or a finger ring. The wearable device includes inertial sensors. The inertial sensors are configured to detect and measure acceleration, tilt, shock, vibration, rotation, and multi-degree of freedom (DoF) motion. The inertial sensors include an accelerometer (or an acceleration sensor) and an angular velocity sensor (a gyro) and their single-, dual-, and three-axis combined inertial measurement unit (IMU). It can be understood that the present disclosure does not impose any limitations to the specific types and models of the inertial sensors. For example, the inertial sensors are divided into two categories: one is an angular velocity gyroscope, and the other is an acceleration sensor. The angular velocity gyroscope may be a mechanical, dry liquid floated, semi-liquid floated or air floated angular rate gyroscope, or a fiber angular rate gyroscope, or the like. The acceleration sensor may be a mechanical linear accelerometer, a flexible linear accelerometer, or the like.

As shown in FIG. 1, the wearable device (taking a bracelet as an example for presentation and description in FIG. 1, also referred to as a wristband) further includes at least two screen display areas. Screen structures of the screen display areas may be made of a flexible screen material with expandability. Specifically, each screen display area may be an independent display screen, and the wearable device includes a screen including at least two independent display screens and having multiple display areas. Alternatively, the wearable device includes a display screen, and the display screen may include multiple display areas. When a user wears the wearable device, to reduce cumbersome operations of manually adjusting the screen display areas to be within a sight range before the user wants to turn on the wearable device for certain operations, the positions of the screen display areas are set to satisfy that: the screen display areas are not located on the same plane at the same time. For example, the wearable device is provided with two independent display screens. When the user wears the wearable device, one of the independent display screens is located at the top of the wrist, and the other independent display screen is located at the bottom of the wrist.

Figure 2:
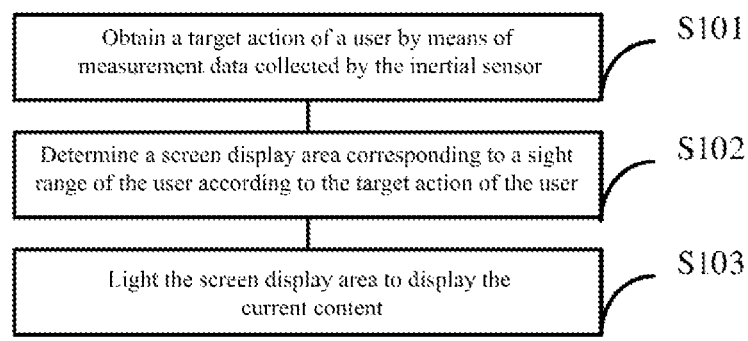
FIG. 2 is a flowchart of a display method according to an example implementation of the present disclosure.

As shown in FIG. 2, FIG. 2 is a flowchart of a display method according to an example implementation of the present disclosure. The method includes the following steps.

In step S101, a target action of a user is obtained by means of measurement data collected by the inertial sensor.

In step S102, the screen display area corresponding to a sight range of the user is determined according to the target action of the user.

In step S103, the screen display area is lit to display the current content.

Figure 3:
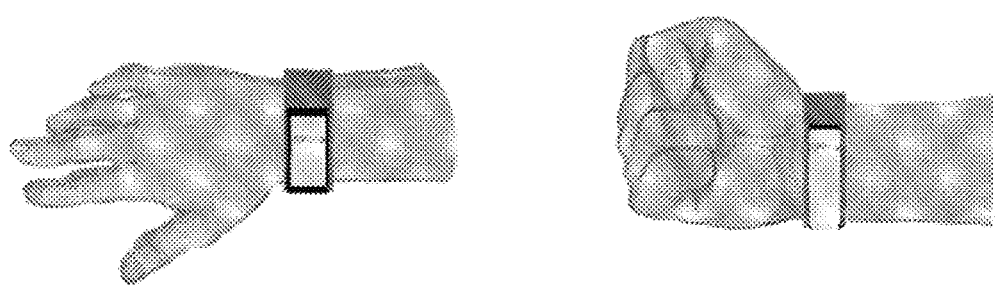
FIG. 3 is a schematic diagram of lighting a screen display area within a sight range of a user after the user wears the wearable device and raises the wrist or turns over the wrist according to an example implementation of the present disclosure.

In the implementations of the present disclosure, the screen display area corresponding to the sight range of the user is determined according to the target action of the user, and then the screen display area within the sight range of the user is automatically lit, while other screen display areas remain off. In this case, the user can view corresponding information by means of the screen display area within the sight range, and other screen display areas that are off are beneficial to saving power. It should be noted that, in the implementations of the present disclosure, considering the action of the user of viewing the displayed content on the screen when wearing the wearable device, a direction that is upward relative to the ground is defined as the direction corresponding to the sight range of the user, and the screen display area facing up relative to the ground is determined as the screen display area corresponding to the sight range of the user. It can be understood that the size of the screen display area can be specifically set according to actual situations, and the present disclosure does not impose any limitations to this. In an example, referring to FIG. 3, after the user wears the wearable device (for example a wristband) and raises or turns over the wrist, if the screen display area facing up relative to the ground is located at the top of the wrist, it is determined that the screen display area located at the top of the wrist (corresponding to the back of the hand facing up, i.e., the palm of the hand facing down) is within the sight range of the user, the screen display area located at the top of the wrist is lit, and the screen display areas on other positions remain off. If the screen display area facing up relative to the ground is located at the bottom of the wrist, it is determined that the screen display area located at the bottom of the wrist (corresponding to the palm of the hand facing up) is within the sight range of the user, the screen display area located at the bottom of the wrist is lit, and the screen display areas on other positions remain off.

In step S101, when the user wears the wearable device, measurement data can be collected by means of the inertial sensor, and the measurement data includes acceleration data and angular velocity data in three axis directions in a three-dimensional coordinate system, so that the wearable device obtains the target action of the user based on the collected measurement data.

Figure 4:
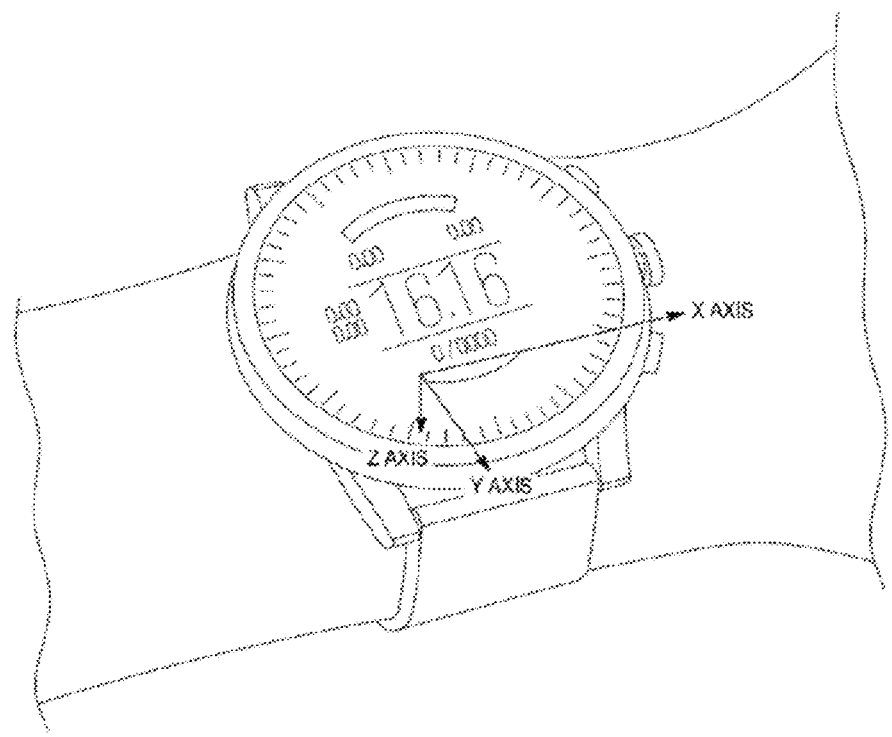
FIG. 4 is a schematic diagram of example orientations of a three-dimensional coordinate system according to an example implementation of the present disclosure.
Figure 5A:
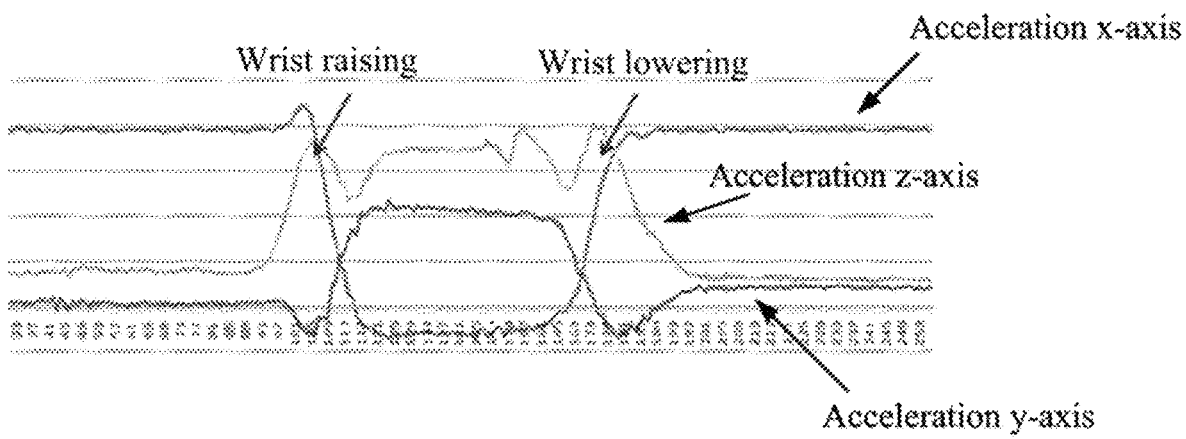
FIG. 5A is a schematic diagram of three-axis acceleration data waveforms when the back of the hand faces up after the wrist is raised and then the wrist is lowered according to an example implementation of the present disclosure.
Figure 6A:
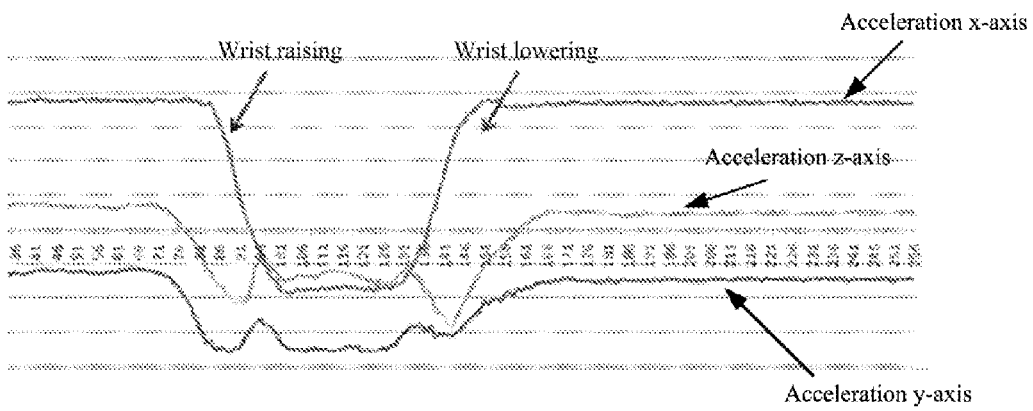
FIG. 6A is a schematic diagram of three-axis acceleration data waveforms when the back of the hand faces up after the wrist is raised and then the wrist is lowered according to an example implementation of the present disclosure.

In an implementation, the wearable device can obtain a wrist raising action of the user according to the acceleration data in the three axis directions in the three-dimensional coordinate system measured by the inertial sensor. In an example, for example, the wearable device is worn on the right hand, and the orientations of the three-dimensional coordinate system defined in FIG. 4 are taken as an example for description (it should be noted that the wrist raising action is described with the orientations of the three-dimensional coordinate system when the dial is worn on the back of the hand in FIG. 4). In the three-dimensional coordinate system shown in FIG. 4, in the case that the wearable device is worn on the left hand of the user, and the display screen thereof is parallel to the ground, the plane formed by a Y axis and an X axis is parallel to the plane formed by the display screen, and the X axis is parallel to the arm and the direction thereof corresponds to a text display direction (from left to right). The Y axis is perpendicular to the arm and the direction thereof points to the side where the body is located. A Z axis is perpendicular to the plane formed by the X axis and the Y axis, and is the same as a direction of gravitational acceleration. Moreover, it should be notated that in all examples of the present disclosure, it is defined that if the direction of acceleration of any one of the three axes is the same as the direction of gravitational acceleration or the included angle with the gravitational acceleration is less than 90°, the acceleration data of this axis is a negative value; if the included angle with the gravitational acceleration is equal to 90°, the acceleration data is 0; and if this direction is opposite to the direction of gravitational acceleration or the included angle with the gravitational acceleration is greater than 90°, the acceleration data is a positive value. Please referring to FIG. 5A (FIG. 5A is a diagram of three-axis acceleration data waveforms when the back of the hand faces up after the wrist is raised and then the wrist is lowered) and FIG. 6A (FIG. 6A is diagram of three-axis acceleration data waveforms when the palm of the hand faces up after the wrist is raised and then the wrist is lowered), it can be seen that, in the user's wrist raising process, the accelerations of the three axes all change accordingly. Therefore, it is possible to determine whether the current action of the user is the wrist raising action based on the acceleration data in the three axis directions.

Certainly, in the user's right wrist raising process, the acceleration data of the three axes in FIG. 5A and FIG. 6A all have noticeable change trends. For example, the X axis gradually changes from a direction opposite to the direction of gravitational acceleration to a direction perpendicular to the direction of gravitational acceleration, and the X-axis acceleration data shows a change trend from high to low (gradually decreasing from a positive value to 0 or even a negative value). Moreover, in FIG. 5A, the Z axis and Y axis gradually change from the direction perpendicular to the gravitational acceleration to the direction forming an included angle of greater than 90° with the gravitational acceleration, and the Z-axis acceleration data and the Y-axis acceleration show a change trend from low to high (gradually changing from close to 0 to positive). In FIG. 6A, the Z axis and Y axis gradually change from the direction perpendicular to the gravitational acceleration to the direction forming an included angle of less than 90° with the gravitational acceleration, and the Z-axis acceleration data and the Y-axis acceleration show a change trend from high to low (gradually changing from close to 0 to negative). In addition, it can be accordingly concluded that when the user wears the wearable device on the left hand and performs a wrist raising action, whether it is a wrist raising action with the back of the hand up or a wrist raising action with the palm of the hand up, the X axis gradually changes from a direction the same as the direction of gravitational acceleration to the direction perpendicular to the gravitational acceleration, and the X-axis acceleration data shows a change trend from low to high (gradually increasing from a negative value to 0 or even a positive value). Moreover, for the wrist raising action with the back of the hand up, the Z axis and Y axis gradually change from the direction perpendicular to the gravitational acceleration to the direction forming an included angle of greater than 90° with the gravitational acceleration, and the Z-axis acceleration data and the Y-axis acceleration show a change trend from low to high (gradually changing from close to 0 to positive). For the wrist raising action with the palm of the hand up, the Z axis and Y axis gradually change from the direction perpendicular to the gravitational acceleration to the direction forming an included angle of less than 90° with the gravitational acceleration, and the Z-axis acceleration data and the Y-axis acceleration show a change trend from high to low (gradually changing from close to 0 to negative). Thus, in a possible example, it is also possible to determine whether the current action of the user is a wrist raising action based on the change trend of the X-axis acceleration data, the Y-axis acceleration, or the Z-axis acceleration respectively, or by means of a pairwise combination, such as the combination of the X-axis acceleration data and the Y-axis acceleration, or the combination of the X-axis acceleration data and the Z-axis acceleration.

It should be noted that when the user wears the wearable device, the wearable device allows the user to input a corresponding wearing mode in advance (i.e., wearing on the right hand or wearing on the left hand). Therefore, the wearable device can determine whether the wearable device is worn on the left hand or the right hand of the user by means of the wearing mode inputted by the user.

Figure 5B:
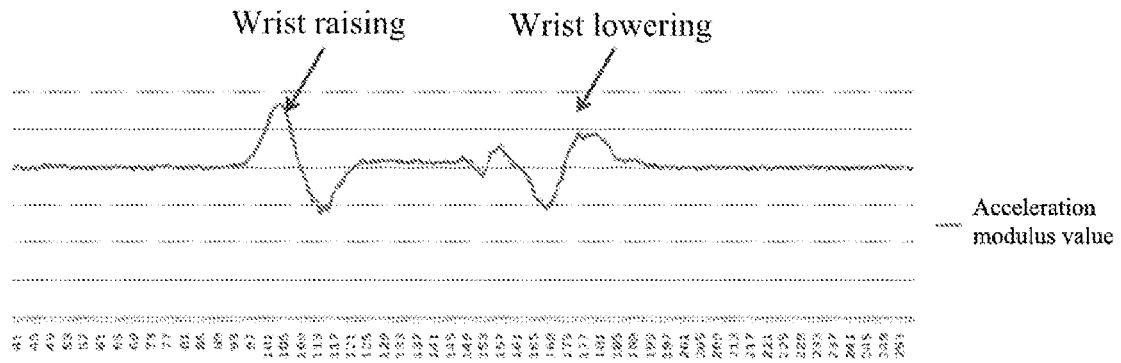
FIG. 5B is a schematic diagram of a waveform of a modulus value of three-axis acceleration data when the back of the hand faces up after the wrist is raised and then the wrist is lowered according to an example implementation of the present disclosure.
Figure 6B:
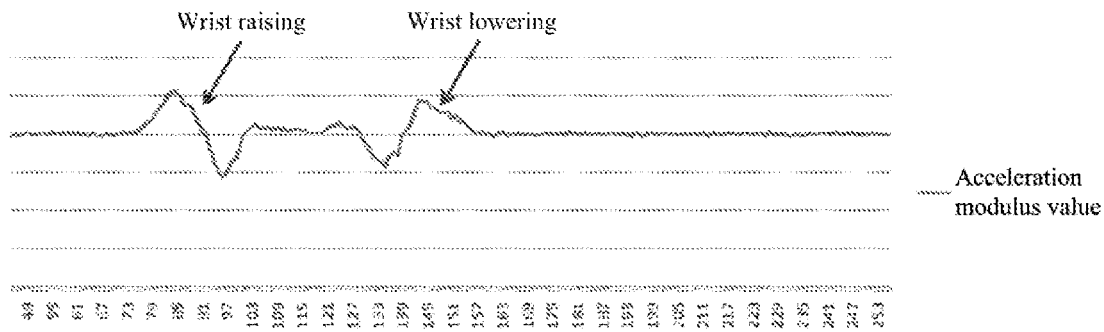
FIG. 6B is a schematic diagram of a waveform of a modulus value of three-axis acceleration data when the back of the hand faces up after the wrist is raised and then the wrist is lowered according to an example implementation of the present disclosure.

In addition, an error still occurs when determining whether the current action of the user is a wrist raising reaction by using the change trend of the X-axis acceleration data, the Y-axis acceleration, or the Z-axis acceleration separately. On this basis, the wearable device can also calculate an acceleration modulus value (e.g., magnitude) according to the acceleration data in the three axis directions in the three-dimensional coordinate system measured by the inertial sensor, and then determine the wrist raising action according to the acceleration modulus value. The acceleration modulus value is the $M^{th}$ power of the sum of the $N^{th}$ power of the acceleration data in the three axis directions. M and N are not equal to 0, and M and N may be integers, fractions, or negative numbers, such as the square root of the power of 2 or the power of the reciprocal of the base. In an example, taking the acceleration modulus value being the value of the square root of the sum of the squares of the acceleration data in the three axis directions as an example for description: suppose the acceleration modulus value is a, then $a=\sqrt{x^2+y^2+z^2}$. Please referring to FIG. 5B (FIG. 5B is a schematic diagram of a waveform of a modulus value of the three-axis acceleration data in FIG. 5A) and FIG. 6B (FIG. 6B is a schematic diagram of a waveform of a modulus value of the three-axis acceleration data in FIG. 6A), it can be seen that after the wrist is raised, no matter whether the palm of the hand faces up or the back of the hand faces up, the waveform changes of the acceleration modulus value are basically the same, and the change trends are relatively obvious. Therefore, in the implementations of the present disclosure, it is possible to determine whether the current action of the user is a wrist raising action based on the acceleration modulus value, which is beneficial to improving the accuracy of action recognition.

In a specific implementation, a classification model may be built in advance. The classification model is configured to recognize a wrist raising action based on the inputted acceleration modulus value. The wearable device can calculate the acceleration modulus value based on three-axis acceleration data, and then input the acceleration modulus value as an input parameter into the classification model, so that the classification model outputs an action recognition result (a wrist raising action or not a wrist raising action) based on the acceleration modulus value, which is beneficial to improving the recognition accuracy. It can be understood that the present disclosure does not impose any limitations to the training method of the classification model, which can be specifically selected according to actual situations. For example, the classification model may be trained based on a neural network algorithm, a Bayesian algorithm, a vector machine algorithm, or the like.

Figure 7A:
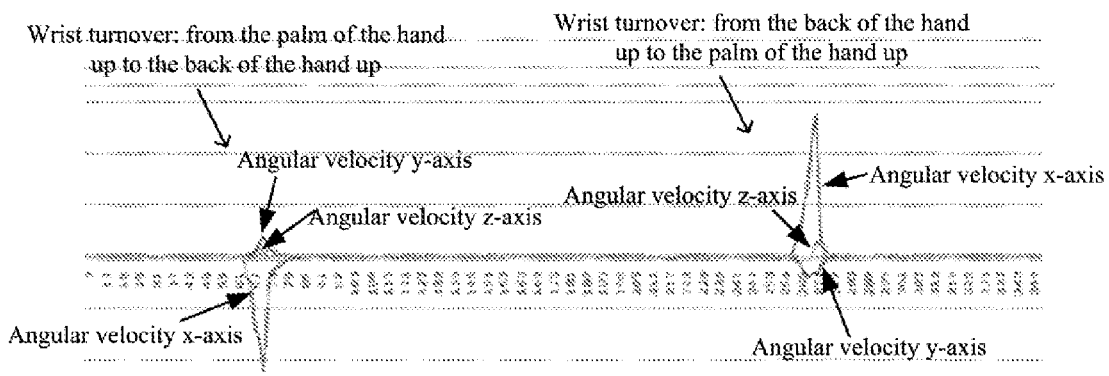
FIG. 7A is a schematic diagram of three-axis angular velocity data waveforms of a wrist turnover action according to an example implementation of the present disclosure.

In another implementation, the wearable device can obtain a wrist turnover action of the user based on X-axis angular velocity data in the three-dimensional coordinate system measured by the inertial sensor. In an example, in the orientations of the three-dimensional coordinate system defined in FIG. 4 (it should be noted that the wrist raising action is described with the orientations of the three-dimensional coordinate system when the dial is worn on the back of the hand in FIG. 4), please referring to FIG. 7A (FIG. 7A is a diagram of three-axis angular velocity data waveforms of a wrist turnover action), it can be seen that when the user wears the wearable device on the right hand and performs a wrist turnover action, if the wrist turnover action is turning from the back of the hand up to the palm of the hand up, the wrist rotates clockwise about the X axis by a certain angle, such as 90° to 180° (corresponding to positive pulse), and if the wrist turnover action is turning from the palm of the hand up to the back of the hand up, the wrist rotates counterclockwise about the X axis by a certain angle, such as 90° to 180° (corresponding to negative pulse). Moreover, when the user wears the wearable device on the left hand and performs a wrist turnover action, if the wrist turnover action is turning from the back of the hand up to the palm of the hand up, the wrist rotates counterclockwise about the X axis by a certain angle, such as 90° to 180° (corresponding to negative pulse), and if the wrist turnover action is turning from the palm of the hand up to the back of the hand up, the wrist rotates clockwise about the X axis by a certain angle, such as 90° to 180° (corresponding to positive pulse). Therefore, there is no need to distinguish whether the wearable device is worn on the left hand or on the right hand, and the wearable device can determine whether the current action of the user is a wrist turnover action by determining whether the X-axis angular velocity data is greater than or equal to a specified threshold. If the X-axis angular velocity data is greater than or equal to the specified threshold, it is determined that the current action of the user is the wrist turnover action, which is beneficial to improving the accuracy of action recognition. It can be understood that the present disclosure does not impose any limitations to the specific value of the specified threshold, which can be specifically set according to actual situations.

In step S102, after the target action of the user is obtained, the screen display area corresponding to the sight range of the user can further be determined according to the target action.

It should be noted that in the implementations of the present disclosure, the direction facing up relative to the ground is defined as the direction corresponding to the sight range of the user, and the screen display area facing up relative to the ground is determined as the screen display area corresponding to the sight range of the user.

Figure 5C:
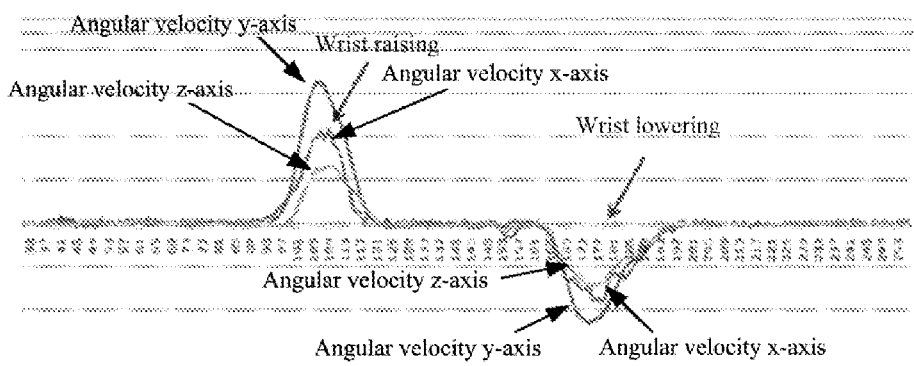
FIG. 5C is a schematic diagram of three-axis angular velocity data waveforms when the back of the hand faces up after the wrist is raised and then the wrist is lowered according to an example implementation of the present disclosure.
Figure 6C:
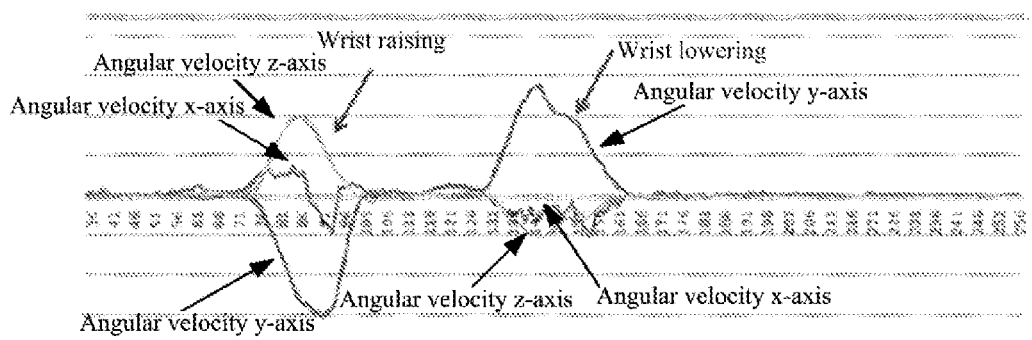
FIG. 6C is a schematic diagram of three-axis angular velocity data waveforms when the back of the hand faces up after the wrist is raised and then the wrist is lowered according to an example implementation of the present disclosure.

In an implementation, when it is determined that the current action of the user is a wrist raising action, the wearable device can determine the direction of the wrist raising action according to Y-axis angular velocity data to determine the screen display area corresponding to the sight range of the user. Specifically, please referring to FIG. 5C (FIG. 5C is a diagram of three-axis angular velocity data waveforms when the back of the hand faces up after the wrist is raised and then the wrist is lowered) and FIG. 6C (FIG. 6C is a diagram of three-axis angular velocity data waveforms when the palm of the hand faces up after the wrist is raised and then the wrist is lowered), it can be seen that when the user wears the wearable device on the right hand and performs a wrist raising action, in FIG. 5C, the Y-axis angular velocity data shows a clockwise rotation angle (positive pulse), and in this case, the screen display area corresponding to the back of the hand (at the top of the wrist) faces up relative to the ground, and is determined as the screen display area corresponding to the sight range of the user; in FIG. 6C, the Y-axis angular velocity data shows a counterclockwise rotation angle (negative pulse), and in this case, the screen display area corresponding to the palm of the hand (at the bottom of the wrist) faces up relative to the ground, and is determined as the screen display area corresponding to the sight range of the user. Moreover, when the user wears the wearable device on the left hand and performs a wrist raising action, the change is opposite to the change when the wearable device is worn on the right hand. If the back of the hand faces up after the wrist is raised, the Y-axis angular velocity data shows a counterclockwise rotation (positive pulse), and in this case, the screen display area corresponding to the back of the hand (at the top of the wrist) faces up relative to the ground, and is determined as the screen display area corresponding to the sight range of the user. When the palm of the hand faces up after the wrist is raised, the Y-axis angular velocity data shows a clockwise rotation, and in this case, the screen display area corresponding to the palm of the hand (at the bottom of the wrist) faces up relative to the ground, and is determined as the screen display area corresponding to the sight range of the user. Therefore, the wearable device can determine the direction of the wrist raising action based on the Y-axis angular velocity data, thereby determining the screen display area corresponding to the sight range of the user. The wearable device can determine the left and right hand wearing situations according to the wearing mode (right hand mode or left hand mode) inputted in advance by the user.

In another implementation, to reduce the cumbersome operations caused by the distinguishing between left and right hands, when it is determined that the current action of the user is a wrist raising action, the wearable device can determine the direction of the wrist raising action according to Z-axis acceleration data to determine the screen display area corresponding to the sight range of the user. In an example, when the user wears the wearable device on the right hand and performs a wrist raising action, if the back of the hand faces up after the wrist is raised, in FIG. 5A, the Z axis gradually changes from a direction perpendicular to the gravitational acceleration to a direction forming an included angle of greater than 90° with the gravitational acceleration, and the Z-axis acceleration data and the Y-axis acceleration show a change trend from low to high (gradually changing from close to 0 to positive). In FIG. 6A, the Z axis gradually changes from the direction perpendicular to the gravitational acceleration to a direction forming an included angle of less than 90° with the gravitational acceleration, and the Z-axis acceleration data and the Y-axis acceleration show a change trend from high to low (gradually changing from close to 0 to negative). Moreover, when the user wears the wearable device on the left hand and performs a wrist raising action, based on the direction of the wrist raising action (the back of the hand faces up or the palm of the hand faces up after the wrist is raised), the change of the Z-axis acceleration data is the same as the change of the Z-axis acceleration data corresponding to the wrist raising action performed when the user wears the wearable device on the right hand. Therefore, there is no need to distinguish whether the user wears the wearable device on the left hand or the right hand. In this implementation, the screen display area facing up relative to the ground can be directly determined based on the change of the Z-axis data. If the change trend is from low to high, the screen display area corresponding to the back of the hand (at the top of the wrist) faces up relative to the ground and is the screen display area corresponding to the sight range of the user; if the change trend is from high to low, the screen display area corresponding to the palm of the hand faces up relative to the ground and is the screen display area corresponding to the sight range of the user. Thus, the steps to distinguish between left and right hands are reduced, and the operation efficiency is improved.

In another implementation, after it is determined that the current action of the user is a wrist turnover action, the wearable device can determine the turnover direction of the wrist turnover action according to Z-axis acceleration data to determine the screen display area corresponding to the sight range of the user. Specifically, please referring to FIG. 7B, it can be seen that when the user wears the wearable device on the right hand and performs a wrist turnover action, if the wrist turnover action is turning from the back of the hand up to the palm of the hand up, the Z axis changes from the same as the direction of gravitational acceleration to opposite to the direction of gravitational acceleration, and the acceleration data thereof changes from negative to positive; if the wrist turnover action is turning from the palm of the hand up to the back of the hand up, the Z axis changes from opposite to the direction of gravitational acceleration to the same as the direction of gravitational acceleration, and the acceleration data changes from positive to negative. Moreover, when the user wears the wearable device on the left hand and performs a wrist turnover action, based on the turnover direction of the action, the change of the Z-axis acceleration data is the same as the change of the Z-axis acceleration data when the wearable device is worn on the right hand. Therefore, there is no need to distinguish whether the wearable device is worn on the left hand or the right hand. The wearable device can determine the turnover direction of the wrist turnover action according to the change of the Z-axis acceleration data, and determine that the screen display area corresponding to a wrist part facing up relative to the ground is the screen display area corresponding to the sight range of the user.

In a specific implementation, the wearable device can obtain the Z-axis acceleration data within a preset time period, then respectively calculate the average value of the first half and the average value of the second half of the Z-axis acceleration data in the preset time period, and finally determine the turnover direction of the wrist turnover action according to signs of the average value of the first half and the average value of the second half of the Z-axis acceleration data, and the magnitude relation between the difference between the two average values and a preset threshold, thereby determining the screen display area corresponding to the sight range of the user. The signs of the average value of the first half and the average value of the second half of the Z-axis acceleration are related to the value of an included angle formed by a Z-axis direction and the direction of gravitational acceleration.

For example, in the orientations of the three-dimensional coordinate system defined in FIG. 4, it is defined that if the direction of the Z-axis acceleration is the same as the direction of gravitational acceleration or the included angle with the gravitational acceleration is less than 90°, the acceleration data is a negative value; if the included angle with the gravitational acceleration is equal to 90°, the acceleration data is a 0; if the direction is opposite to the direction of gravitational acceleration or the included angle with the gravitational acceleration is greater than 90°, and if the wearable device determines that the average value of the first half of the Z-axis acceleration data is positive, the average value of the second half is negative, and the absolute value of the difference between the two is greater than the preset threshold, it is determined that the wrist turnover action is turning to a direction in which the back of the hand faces up, and then it is determined that the display screen area corresponding to the sight range of the user is the screen display area corresponding to the back of the hand. If the wearable device determines that the average value of the first half of the Z-axis acceleration data is negative, the average value of the second half is positive, and the absolute value of the difference between the two is greater than the preset threshold, it is determined that the wrist turnover action is turning to a direction in which the palm of the hand faces up, and then it is determined that the display screen area corresponding to the sight range of the user is the screen display area corresponding to the palm of the hand.

Figure 7B:
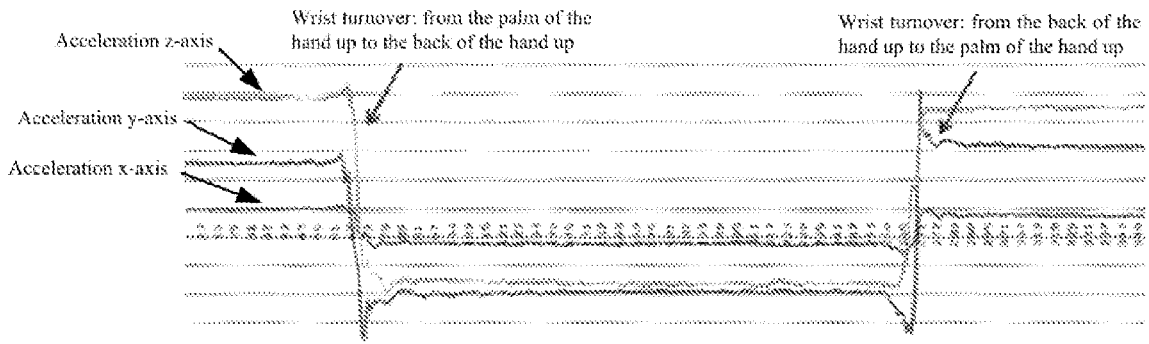
FIG. 7B is a schematic diagram of three-axis acceleration data waveforms of a wrist turnover action according to an example implementation of the present disclosure.

Specifically, taking the orientations of the three-dimensional coordinate system defined in FIG. 4, in which the wearable device includes two screen display areas, and when the user wears the wearable device, one screen display area is located at the top of the wrist and the other screen display area is located at the bottom of the wrist as an example for description: please referring to FIG. 7B, suppose the average value of the first half of the Z-axis acceleration data is $Z_{qian}$, the average value of the second half is $Z_{hou}$, and the preset threshold is $\beta$; if the obtained Z-axis acceleration data in the preset time period includes the data of a first wrist turnover action (turning from the palm of the hand up to the back of the hand up), when the palm of the hand faces up, the Z axis is opposite to the direction of gravitational acceleration, the calculated average value of the first half is $Z_{qian}>0$; when the back of the hand is turned up, the Z axis is the same as the direction of gravitational acceleration, the calculated average value of the second half is $Z_{hou}<0$, and $Z_{qian}-Z_{hou}>\beta$. In this case, the screen display area located at the top of the wrist faces up relative to the ground, and it is determined that the screen display area located at the top of the wrist is within sight range of the user. Please referring to FIG. 7B, if the obtained Z-axis acceleration data in the preset time period includes the data of a second wrist turnover action (turning from the back of the hand up to the palm of the hand up), when the back of the hand faces up, the Z axis is the same as the direction of gravitational acceleration, the calculated average value of the first half is $Z_{qian}<0$; when the palm of the hand is turned up, the Z axis is opposite to the direction of gravitational acceleration, the calculated average value of the second half is $Z_{hou}>0$, and $Z_{hou}-Z_{qian}>\beta$. In this case, the screen display area located at the bottom of the wrist faces up relative to the ground, and it is determined that the screen display area located at the bottom of the wrist is within sight range of the user. The implementations of the present disclosure are beneficial to improving the accuracy of direction recognition. It can be understood that the implementations of the present disclosure do not impose any limitations to the preset time period and the specific value of the preset threshold, which can be specifically set according to actual situations.

In step S103, in a possible implementation, after determining the screen display area corresponding to the sight range of the user, the wearable device can turn on lighting of the screen display area to display the current content, and automatically sense the sight range of the user without other operation steps of the user of adjusting the screen, thereby facilitating the viewing and reading of the user.

In another possible implementation, to further improve the accuracy of recognition, the wearable device may further be provided with an electromyography sensor. After determining the screen display area corresponding to the sight range of user, the wearable device can determine whether to turn on lighting of the corresponding screen display area according to the data collected by the electromyography sensor. For example, when the data collected by the electromyography sensor meets a preset condition, it is determined that the user wants to turn on lighting of the screen, and then the screen display area corresponding to the sight range of the user is turned on to display the current content. The preset condition includes relevant data representing that the current action of the user is a clenching action. Thus, the occurrence of accidental lighting phenomenon is avoided, and the user experience of the user is improved.

It should be noted that the wearable device includes at least two screen display areas. When the user performs a wrist turnover action, the current content displayed on the screen display area can gradually turn on lighting of the adjacent screen display area based on the turnover direction of the wrist turnover action, and the current content is displayed in the adjacent screen display area, while other screen display areas are in an off state, so as to visually present the effect of moving the display content with the turnover of the user. For example, the wearable device includes three screen display areas, which are respectively located at the top of the wrist, at the front of the wrist, and at the bottom of the wrist of the user when the user wears the wearable device. When the user performs a wrist turnover action of turning from the back of the hand up to the palm of the hand up, the screen display areas are lit in the order of positions at the top of the wrist, at the front of the wrist and at the bottom of the wrist, and display the current content. When one of the screen display areas is lit, other screen display areas are in the off state.

In the implementations of the present disclosure, the wearable device is provided with at least two screen display areas, so that after obtaining the target action of the user based on the measurement data of the inertial sensor, the wearable device can determine the screen display area corresponding to the sight range of the user according to the target action of the user, and then turn on lighting of the screen display area to display the current content. A process of automatically determining and turn on lighting of the screen display area corresponding to the sight range of the user is achieved, without the need for the user to manually adjust the position of the screen, so that the use experience of the user is further improved.

In the present disclosure, the intelligent wearable device is worn on an upper limb. The wearable device obtains a wrist raising action of the user according to the acceleration data in the three axis directions in the three-dimensional coordinate system measured by the inertial sensor, to ensure the accuracy of action recognition.

In the present disclosure, the wrist raising action is determined according to a modulus value of the acceleration data in the three axis directions, which is beneficial to improving the accuracy of action recognition.

In the present disclosure, the direction of the wrist raising action is determined according to Z-axis acceleration data or Y-axis angular velocity data to determine the screen display area corresponding to the sight range of the user, and the sight range of the user is accurately positioned based on usage habits of the user, thereby determining the corresponding screen display area, to facilitate use by the user.

In the present disclosure, the wrist turnover action of the user is obtained based on the measured X-axis angular velocity data in the three-dimensional coordinate system, to ensure the accuracy of action recognition.

In the present disclosure, determining whether the X-axis angular velocity data is greater than or equal to a specified threshold, and if yes, determining the action as the wrist turnover action are beneficial to improving the accuracy of action recognition.

In the present disclosure, the turnover direction of the wrist turnover action is determined according to Z-axis acceleration data to determine the screen display area corresponding to the sight range of the user, so as to accurately position the sight range of the user, thereby improving the use experience of the user.

In the present disclosure, an implementation for determining the turnover direction of the wrist turnover action is provided. Firstly, the Z-axis acceleration data within a preset time period is obtained; then, the average value of the first half and the average value of the second half of the Z-axis acceleration data in the preset time period are respectively calculated; and finally, the turnover direction of the wrist turnover action is determined according to the two average values. This is beneficial to improving the accuracy of direction recognition.

In the present disclosure, the intelligent wearable device further includes an electromyography sensor. The wearable device can determine whether to light the screen display area corresponding to the sight range of the user by means of the data collected by the electromyography sensor, thereby improving the accuracy of screen lighting and avoiding the occurrence of accidental lighting events.

In the present disclosure, the wearable device can also automatically determine the display direction of the current content according to the target action, and then adjust the current content, without the need for the user to perform other adjustment operations, thereby facilitating reading the current content by the user.

In the present disclosure, a wrist turning action of the user is obtained according to Z-axis angular velocity data in the three-dimensional coordinate system, to ensure the accuracy of action recognition.

In the present disclosure, determining whether the Z-axis angular velocity data is greater than or equal to a preset threshold, and if yes, determining the action as the wrist turning action are beneficial to improving the accuracy of action recognition.

In the present disclosure, a turnover direction of the wrist turning action is determined according to X-axis and Y-axis acceleration data to determine the display direction of the current content, so as to precisely position the display direction of the content, thereby facilitating viewing the displayed current content by the user.

In the present disclosure, an implementation for determining the turnover direction of the wrist turning action is provided. Firstly, the X-axis acceleration data and the Y-axis acceleration data within a preset time period are obtained; then, the average values of the first halves and the average values of the second halves of the X-axis acceleration data and the Y-axis acceleration data in the preset time period are respectively calculated; and finally, the turnover direction of the wrist turning action is determined according to the four average values. This is beneficial to improving the accuracy of direction recognition.

Figure 8:
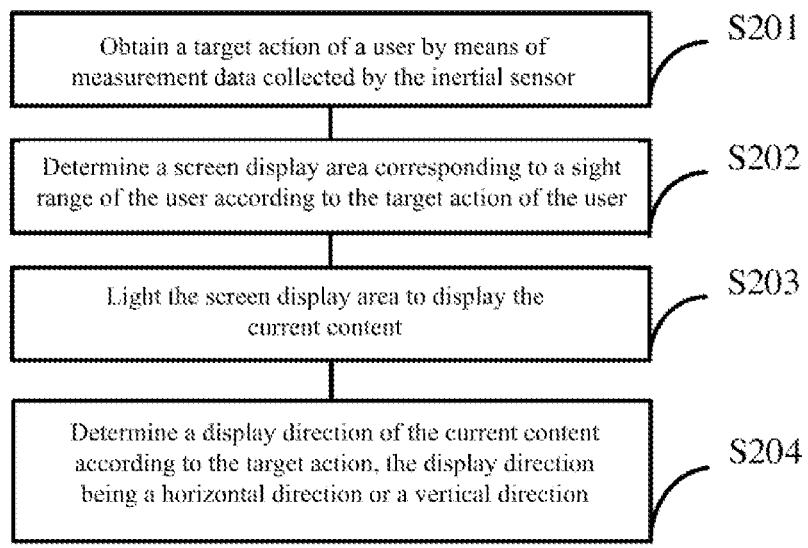
FIG. 8 is a flowchart of a second display method according to an example implementation of the present disclosure.

FIG. 8 is another flowchart of a display method according to an example implementation of the present disclosure. FIG. 8 describes the solution of the present disclosure in more detail relative to FIG. 2.

As shown in FIG. 8, the method can be applied to the wearable device. The wearable device includes an inertial sensor and at least two screen display areas. The wearable device is worn on an upper limb. When a user wears the wearable device, the screen display areas are not located on the same plane at the same time. The method includes the following steps.

In step S201, a target action of the user is obtained by means of measurement data collected by the inertial sensor.

In step S202, the screen display area corresponding to a sight range of the user is determined according to the target action of the user. This step is similar to step S102 in FIG. 2, and is not detailed herein again.

In step S203, the screen display area is lit to display the current content. This step is similar to step S103 in FIG. 2, and is not detailed herein again.

In step S204, a display direction of the current content is determined according to the target action to adjust the current content, the display direction being a horizontal direction or a vertical direction.

Figure 9:
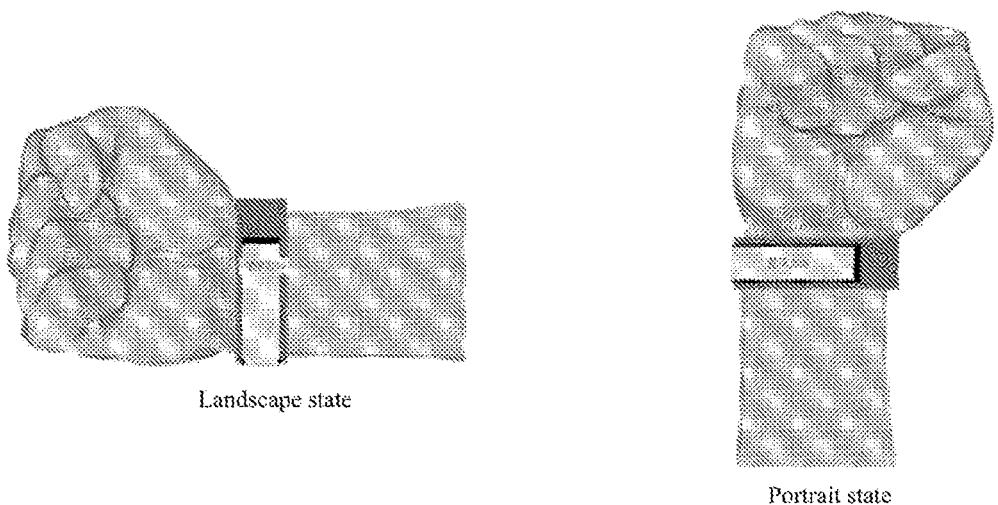
FIG. 9 is a schematic diagram of changing a content display direction when a user wears the wearable device and turns the wrist according to an example implementation of the present disclosure.

In the implementations of the present disclosure, the display direction of the current content can be determined according to the target action of the user, and then the current content can be adjusted, to facilitate the viewing of the user. It should be noted that the target action may be a wrist turning action. The wrist turning action includes two situations. One is wrist turning in the vertical direction, that is, an arm of the user is turned from a horizontal direction parallel to the ground to a vertical direction perpendicular to the ground. The second is wrist turning in the horizontal direction, that is, the arm of the user is turned from a horizontal direction parallel to the body to a vertical direction perpendicular to the body (it should be noted that the vertical direction perpendicular to the body is not completely parallel to the ground direction, and has a certain included angle with the ground, and the angle is less than 90°). In an example, please referring to FIG. 9, after the user wears the wearable device (taking a bracelet as an example for description in FIG. 9) and turns the wrist, if the arm of the user is turned from the horizontal direction parallel to the ground to the vertical direction perpendicular to the ground, or from the horizontal direction parallel to the body to the vertical direction perpendicular to the body, the wearable device adjusts the current content in the lit screen display area to the vertical direction ("portrait state"). If the arm of the user is turned from the vertical direction perpendicular to the ground to the horizontal direction parallel to the ground, or from the vertical direction perpendicular to the body to the horizontal direction parallel to the body, the wearable device adjusts the current content of the lit screen display area to the horizontal direction ("landscape state").

In step S201, the wearable device can obtain the wrist turning action of the user according to Z-axis angular velocity data in the three-dimensional coordinate system measured by the inertial sensor. It should be noted that, based on the actual situation of the user, for the wrist turning action in the present disclosure, only the wrist turning action with the palm of the hand up is considered.

Figure 10A:
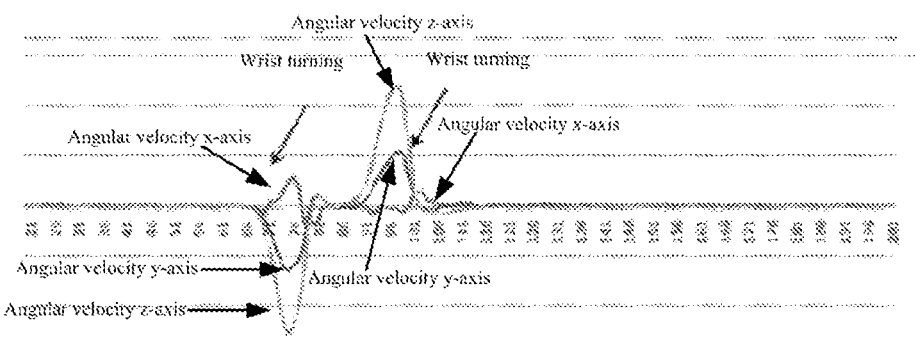
FIG. 10A is a schematic diagram of three-axis angular velocity data waveforms when turning the wrist in a vertical direction according to an example implementation of the present disclosure.
Figure 11A:
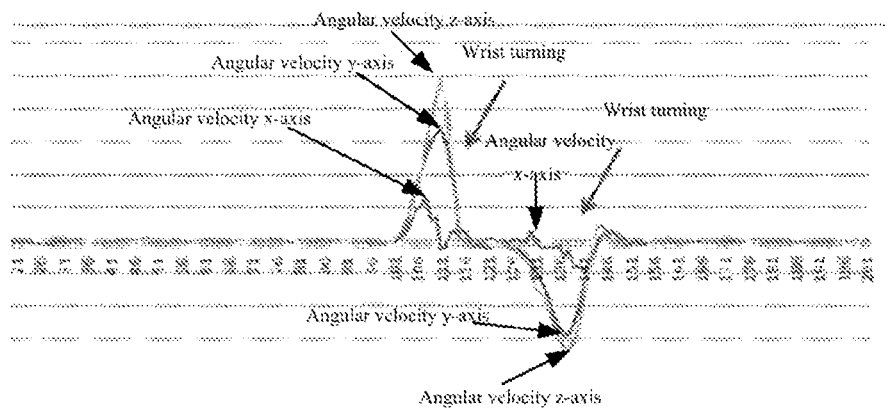
FIG. 11A is a schematic diagram of three-axis angular velocity data waveforms when turning the wrist in a horizontal direction according to an example implementation of the present disclosure.

In an example, in the orientations of the there-dimensional coordinate system defined in FIG. 4, please referring to FIG. 10A (FIG. 10A is a diagram of three-axis angular velocity data waveforms when turning the wrist in a vertical direction) and FIG. 11A (FIG. 11A is a diagram of three-axis angular velocity data waveforms when turning the wrist in a horizontal direction), it can be seen that when the user wears the wearable device on the right hand, and performs a first wrist turning action with the palm of the hand up, please referring to the first wrist turning change trend in FIG. 10A and FIG. 11A, in FIG. 10A (the arm of the user is turned from the vertical direction perpendicular to the ground to the horizontal direction parallel to the ground), the Z-axis angular velocity shows a certain counterclockwise rotation angle, such as 80°-90° (negative pulse), and in FIG. 11A (in the horizontal direction, the arm of the user is turned from the vertical direction perpendicular to the body to the horizontal direction parallel to the body), the Z-axis angular velocity shows a certain clockwise rotation angle (positive pulse). When the user wears the wearable device on the right hand, and performs a second wrist turning action with the palm of the hand up, please referring to the second wrist turning change trend in FIG. 10A and FIG. 11A, in FIG. 10A (the arm of the user is turned from the horizontal direction parallel to the ground to the vertical direction perpendicular to the ground), the Z-axis angular velocity shows a certain clockwise rotation angle, such as 80°-90° (positive pulse), and in FIG. 11A (in the horizontal direction, the arm of the user is turned from the horizontal direction parallel to the body to the vertical direction perpendicular to the body), the Z-axis angular velocity shows a certain counterclockwise rotation angle (negative pulse).

When the user wears the wearable device on the left hand and performs a wrist turning action with the palm of the hand up, if the wrist turning action is in the vertical direction, the arm of the user is turned from the vertical direction perpendicular to the ground to the horizontal direction parallel to the ground, and the Z-axis angular velocity shows a clockwise rotation trend (positive pulse); and the arm of the user is turned from the horizontal direction parallel to the ground to the vertical direction perpendicular to the ground, and the Z-axis angular velocity shows a counterclockwise rotation trend (negative pulse). If the wrist turning action is in the horizontal direction, the arm of the user is turned from the vertical direction perpendicular to the body to the horizontal direction parallel to the body, and the Z-axis angular velocity shows a counterclockwise rotation trend (negative pulse); and the arm of the user is turned from the horizontal direction parallel to the body to the vertical direction perpendicular to the body, and the Z-axis angular velocity shows a clockwise rotation trend (positive pulse).

Therefore, there is no need to distinguish whether the wearable device is worn on the left hand or on the right hand, and there is no need to distinguish whether the wrist is turned in the horizontal direction or in the vertical direction. The wearable device can determine whether the action is a wrist turning action by determining whether the Z-axis angular velocity data is greater than or equal to a preset threshold, and if yes, determine that the current action of the user is the wrist turning action. The implementations of the present disclosure are beneficial to improving the accuracy of action recognition. It can be understood that the present disclosure does not impose any limitations to the preset threshold, which can be specifically set according to actual situations.

Figure 10B:
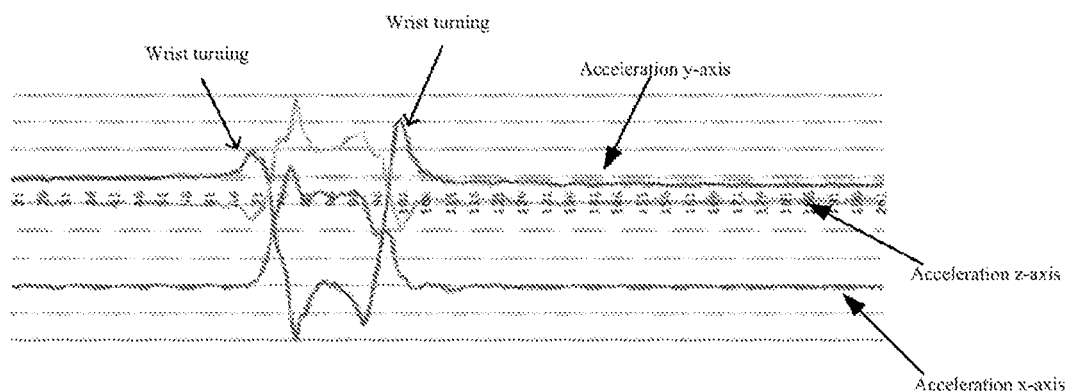
FIG. 10B is a schematic diagram of three-axis acceleration data waveforms when turning the wrist in a vertical direction according to an example implementation of the present disclosure.
Figure 11B:
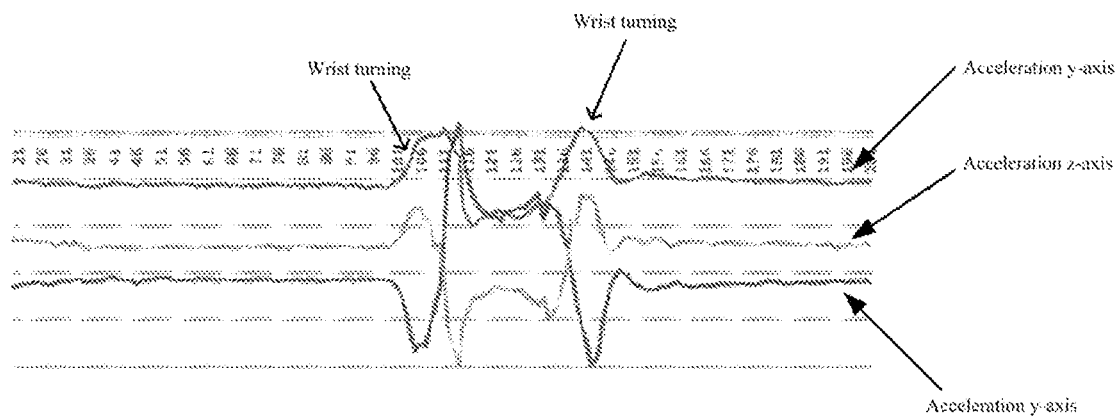
FIG. 11B is a schematic diagram of three-axis acceleration data waveforms when turning the wrist in a horizontal direction according to an example implementation of the present disclosure.

In step S204, please referring to FIG. 10B (FIG. 10B is a diagram of three-axis acceleration data waveforms when turning the wrist in a vertical direction) and FIG. 11B (FIG. 11B is a diagram of three-axis acceleration data waveforms when turning the wrist in a horizontal direction), after determining that the action is the target action, the wearable device can determine a turnover direction of the wrist turning action according to X-axis and Y-axis acceleration data to determine the display direction of the current content, thereby adjusting the current content according to the display direction of the current content to facilitate the reading of the user.

In an example, the user wears the wearable device. Assuming that the current direction is a horizontal direction parallel to the ground and parallel to the body, and the palm of the hand faces up, the screen display area corresponding to the sight range of the user is a screen display area at the bottom of the wrist. In this case, the screen display area at the bottom of the wrist is lit, and the text display direction of the current content is the horizontal direction (landscape display). If the user performs a wrist turning action of turning to a vertical direction perpendicular to the ground or a vertical direction perpendicular to the body, and the palm of the hand faces up, the text display direction of the current content in the currently lit screen display area at the bottom of the wrist is changed from the horizontal direction to the vertical direction (portrait display).

In a second example, the user wears the wearable device. Assuming that the current direction is the vertical direction perpendicular to the ground and the vertical direction perpendicular to the body, and the palm of the hand faces up, the screen display area corresponding to the sight range of the user is a screen display area at the bottom of the wrist. In this case, the screen display area at the bottom of the wrist is lit, and the text display direction of the current content is the vertical direction (portrait display). If the user performs a wrist turning action of turning to the horizontal direction parallel to the ground and parallel to the body, and the palm of the hand faces up, the text display direction of the current content in the currently lit screen display area at the bottom of the wrist is changed from the vertical direction to the horizontal direction (landscape display).

In an implementation, the wearable device can obtain the X-axis acceleration data and the Y-axis acceleration data within a preset time period, then respectively calculate the average values of the first halves and the average values of the second halves of the X-axis acceleration data and the Y-axis acceleration data in the preset time period, and finally determine the turnover direction of the wrist turning action according to signs of the average values of the first halves and the average values of the second halves of the X-axis acceleration data and the Y-axis acceleration data, the magnitude relation between the difference between the two average values of the X-axis acceleration data and a preset threshold, and the magnitude relation between the difference between the two average values of the Y-axis acceleration data and the preset threshold. The signs of the average value of the first half and the average value of the second half of the X-axis acceleration are related to the value of an included angle formed by an X-axis direction and a direction of gravitational acceleration, and the signs of the average value of the first half and the average value of the second half of the Y-axis acceleration are related to the value of an included angle formed by a Y-axis direction and the direction of gravitational acceleration.

In an example, taking the orientations of the three-dimensional coordinate system shown in FIG. 4 as an example (it should be noted that the wrist turning action is described based on the orientations of the three-dimensional coordinate system when the dial is worn on the palm of the hand in FIG. 4), and it is defined that if the directions of the X-axis and Y-axis accelerations are the same as the direction of gravitational acceleration or the included angles with the direction of gravitational acceleration are less than 90°, the acceleration data is a negative value. If the included angles with the direction of gravitational acceleration are equal to 90°, the acceleration data is 0. If the directions are opposite to the direction of gravitational acceleration or the included angles with the gravitational acceleration are greater than 90°, the following description is made: the wearable device obtains the X-axis acceleration data and the Y-axis acceleration data within a preset time period; if the average value of the first half of the X-axis acceleration data is negative, the average value of the second half is positive, and the absolute value of the difference between the two average values of the X-axis acceleration data is greater than a specified threshold, and if the average value of the first half of the Y-axis acceleration data is positive, the average value of the second half is negative, and the absolute value of the difference between the two average values of the Y-axis acceleration data is greater than the specified threshold, determines that the wrist turning action is turning to the horizontal direction parallel to the ground; and if the average value of the first half of the X-axis acceleration data is positive, the average value of the second half is negative, and the absolute value of the difference between the two average values of the X-axis acceleration data is greater than the specified threshold, and if the average value of the first half of the Y-axis acceleration data is negative, the average value of the second half is positive, and the absolute value of the difference between the two average values of the Y-axis acceleration data is greater than the specified threshold, determines that the wrist turning action is turning to the vertical direction perpendicular to the ground.

Specifically, please referring to FIG. 10B and FIG. 11B, suppose the average value of the first half of the X-axis acceleration data is $\overline{X}_{qian}$ and the average value of the second half is $\overline{X}_{hou}$, the average value of the first half of the Y-axis acceleration data is $\overline{Y}_{qian}$ and the average value of the second half is $\overline{Y}_{hou}$, and the preset threshold is $\sigma$, if the obtained X-axis acceleration data and Y-axis acceleration data within the preset time period include data of a first wrist turning action (the arm of the user is turned from the vertical direction perpendicular to the ground to the horizontal direction parallel to the ground, or is turned from the vertical direction perpendicular to the body to the horizontal direction parallel to the body), as shown in FIG. 10B (wrist turning in the vertical direction), the right hand of the user is in the vertical direction perpendicular to the ground before wearing the wearable device and performing the wrist turning action, the X axis thereof is the same as the direction of gravitational acceleration, and is a negative value; the Y axis is perpendicular to the gravitational acceleration or forms an included angle of greater than 90°, and is 0 or greater than 0. After the wrist turning action is performed, the X axis is perpendicular to the gravitational acceleration or forms an included angle of greater than 90°, and is 0 or a positive value greater than 0, the Y axis forms an included angle of less than 90° with the gravitational acceleration, and is a negative value, and the change trend of the wrist turning action in the vertical direction when wearing the wearable device on the left hand is the same as that in FIG. 10B. As shown in FIG. 11B (wrist turning in the horizontal direction), the X axis forms an included angle of less than 90° with the gravitational acceleration, and is a negative value, and the Y axis forms an included angle of less than 90° with the gravitational acceleration, and is a negative value. After the wrist turning action is performed, the X axis is perpendicular to the gravitational acceleration or forms an included angle of greater than 90°, and is 0 or a positive value greater than 0, the Y axis forms an included angle of less than 90° with the gravitational acceleration, and is a negative value, and the change trend of the wrist turning action in the horizontal direction when wearing the wearable device on the left hand is the same as that in FIG. 11B. Thus, the calculated average value of the first half of the X axis is $\overline{X}_{qian}>0$ and the average value of the second half is $\overline{X}_{hou}>0$, the calculated average value of the first half of the Y axis is $\overline{Y}_{qian}>0$ and the average value of the second half is $\overline{Y}_{hou}>0$, $\overline{X}_{hou}-\overline{X}_{qian}>\sigma$ and $\overline{Y}_{qian}-\overline{Y}_{hou}>\sigma$. In this case, it is determined that the display direction of the current content is the horizontal direction, and the current content is displayed in a landscape mode.

If the obtained Z-axis acceleration data within the preset time period includes data of a second wrist turning action (the arm of the user is turned from the horizontal direction parallel to the ground to the vertical direction perpendicular to the ground, or is turned from the horizontal direction parallel to the body to the vertical direction perpendicular to the body), as shown in FIG. 10B and FIG. 11B, the change trends of the X axis and Y axis are opposite to the change trends of the X axis and Y axis of the first wrist turning action. Thus, the calculated average value of the first half of the X-axis is $\overline{X}_{qian}>0$ and the average value of the second half is $\overline{X}_{hou}>0$, the calculated average value of the first half of the Y-axis is $\overline{Y}_{qian}<0$ and the average value of the second half is $\overline{Y}_{hou}>0$, and then $\overline{X}_{qian}-\overline{X}_{hou}>\sigma$ and $\overline{Y}_{hou}-\overline{Y}_{qian}>\sigma$. In this case, it is determined that the display direction of the current content is the vertical direction, and the current content is displayed in a portrait mode. The implementations of the present disclosure are beneficial to improving the accuracy of direction recognition. It can be understood that the implementations of the present disclosure do not impose any limitations to the preset time period and the specific value of the preset threshold, which can be specifically set according to actual situations.

In the implementations of the present disclosure, the display direction of the current content is determined according to the target action, so as to adjust the current content according to the display direction, which facilitates the viewing of the user and is beneficial to improving the use experience of the user.

Corresponding to the implementations of the foregoing display method, the present disclosure further provides implementations of a display apparatus and a wearable device to which the display apparatus is applied.

Figure 12:
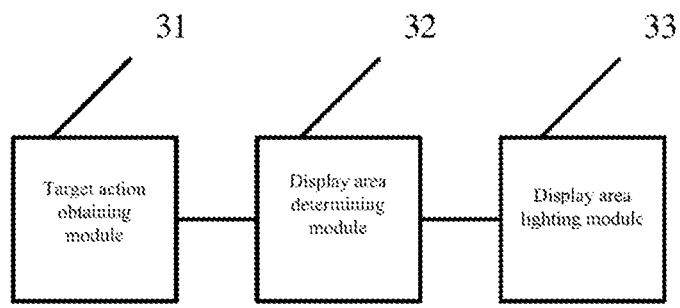
FIG. 12 is a structural block diagram of a display apparatus according to an example implementation of the present disclosure.

As shown in FIG. 12, FIG. 12 is a block diagram of a display apparatus according to an example implementation of the present disclosure. The apparatus is applied to a wearable device. The wearable device includes an inertial sensor and at least two screen display areas. When a user wears the wearable device, the screen display areas are not located on the same plane at the same time.

The apparatus includes a target action obtaining module 31, a display area determining module 32, and a display area lighting module 33. The inertial sensor is configured to collect measurement data.

The target action obtaining module 31 is configured to obtain a target action of a user according to the measurement data.

The display area determining module 32 is configured to determine the screen display area corresponding to a sight range of the user according to the target action of the user.

The display area lighting module 33 is configured to turn on lighting of the screen display area to display the current content.

Optionally, the measurement data includes acceleration data and angular velocity data in three axis directions in a three-dimensional coordinate system.

Optionally, the target action obtaining module 31 is specifically configured to:
obtain a wrist raising action of the user according to the acceleration data in the three axis directions in the three-dimensional coordinate system measured by the inertial sensor.

Optionally, the display area determining module 32 is specifically configured to:
determine the direction of the wrist raising action according to Z-axis acceleration data or Y-axis angular velocity data to determine the screen display area corresponding to the sight range of the user.

Optionally, the target action obtaining module 31 is specifically configured to:
calculate an acceleration modulus value according to the acceleration data in the three axis directions in the three-dimensional coordinate system measured by the inertial sensor to determine the wrist raising action, the acceleration modulus value being the $M^{th}$ power of the sum of the $N^{th}$ power of the acceleration data in the three axis directions, and M and N being not equal to 0.

Optionally, the target action obtaining module 31 is specifically configured to:
obtain a wrist turnover action of the user based on X-axis angular velocity data in the three-dimensional coordinate system measured by the inertial sensor.

Optionally, the target action obtaining module 31 is specifically configured to:
if the X-axis angular velocity data in the three-dimensional coordinate system measured by the inertial sensor is greater than a specified threshold, determine the wrist turnover action.

Optionally, the display area determining module 32 is specifically configured to:
determine the turnover direction of the wrist turnover action according to Z-axis acceleration data to determine the screen display area corresponding to the sight range of the user.

Optionally, the display area determining module 32 includes:
a first acceleration data obtaining unit configured to obtain the Z-axis acceleration data within a preset time period;
a first average value calculating unit configured to respectively calculate the average value of the first half and the average value of the second half of the Z-axis acceleration data in the preset time period;
a first turnover direction determining unit configured to determine the turnover direction of the wrist turnover action according to signs of the average value of the first half and the average value of the second half of the Z-axis acceleration data, and the magnitude relation between the difference between the two average values and a preset threshold, wherein the signs of the average value of the first half and the average value of the second half of the Z-axis acceleration are related to the value of an included angle formed by a Z-axis direction and a direction of gravitational acceleration; and a display area determining unit configured to determine the screen display area corresponding to the sight range of the user according to the turnover direction of the wrist turnover action.

Optionally, if the included angle formed by the Z-axis direction and the direction of gravitational acceleration is less than 90°, a Z-axis acceleration value is negative; if the included angle formed by the Z-axis direction and the direction of gravitational acceleration is equal to 90°, the Z-axis acceleration value is 0; and if the included angle formed by the Z-axis direction and the direction of gravitational acceleration is greater than 90°, the Z-axis acceleration value is positive.

In this implementation, the first turnover direction determining unit includes:
a hand back direction determining subunit configured to, if the average value of the first half of the Z-axis acceleration data is positive, the average value of the second half is negative, and the absolute value of the difference between the two is greater than the preset threshold, determine that the wrist turnover action is turning to a direction in which the back of the hand faces up; and
a hand palm direction determining subunit configured to, if the average value of the first half of the Z-axis acceleration data is negative, the average value of the second half is positive, and the absolute value of the difference between the two is greater than the preset threshold, determine that the wrist turnover action is turning to a direction in which the palm of the hand faces up.

Optionally, the wearable device further includes an electromyography sensor.

The display area lighting module 33 is specifically configured to:
when the data collected by the electromyography sensor meets a preset condition, turn on lighting of the screen display area to display the current content, the preset condition including relevant data representing that the current action of the user is a clenching action.

Figure 13:
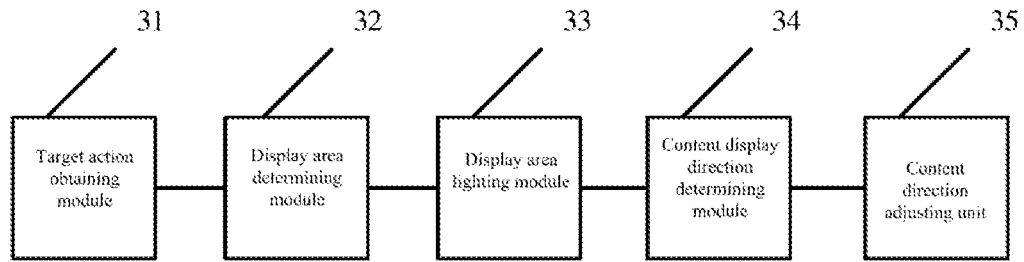
FIG. 13 is a structural block diagram of a second display apparatus according to an example implementation of the present disclosure.

Referring to FIG. 13, the present disclosure further provides a schematic diagram of another display apparatus. Compared with the display apparatus shown in FIG. 12, in the implementation shown in FIG. 13, the apparatus further includes:
a content display direction determining module 34 configured to determine a display direction of the current content according to the target action, the display direction being a horizontal direction or a vertical direction; and
a content adjusting unit 35 configured to adjust the current content based on the display direction.

Optionally, the target action obtaining module 31 is specifically configured to:
obtain a wrist turning action of the user according to Z-axis angular velocity data in the three-dimensional coordinate system measured by the inertial sensor.

Optionally, the target action obtaining module 31 is specifically configured to:

if the Z-axis angular velocity data in the three-dimensional coordinate system measured by the inertial sensor is greater than a preset threshold, determine the wrist turning action.

Optionally, the content display direction determining module 34 is specifically configured to:

determine a turnover direction of the wrist turning action according to X-axis and Y-axis acceleration data to determine the display direction of the current content.

Optionally, the content display direction determining module 34 includes:

a second acceleration data obtaining unit configured to obtain the X-axis acceleration data and the Y-axis acceleration data within a preset time period;

a second average value calculating unit configured to respectively calculate the average values of the first halves and the average values of the second halves of the X-axis acceleration data and the Y-axis acceleration data in the preset time period;

a second turnover direction determining unit configured to determine the turnover direction of the wrist turning action according to signs of the average values of the first halves and the average values of the second halves of the X-axis acceleration data and the Y-axis acceleration data, the magnitude relation between the difference between the two average values of the X-axis acceleration data and a preset threshold, and the magnitude relation between the difference between the two average values of the Y-axis acceleration data and the preset threshold, wherein the signs of the average value of the first half and the average value of the second half of the X-axis acceleration are related to the value of an included angle formed by an X-axis direction and a direction of gravitational acceleration, and the signs of the average value of the first half and the average value of the second half of the Y-axis acceleration are related to the value of an included angle formed by a Y-axis direction and the direction of gravitational acceleration; and a display direction determining unit configured to determine the display direction of the current content according to the turnover direction of the wrist turning action.

Optionally, if the included angles formed by the X-axis and Y-axis directions and the direction of gravitational acceleration are less than 90°, Z-axis and Y-axis acceleration values are negative; if the included angles formed by the X-axis and Y-axis directions and the direction of gravitational acceleration are equal to 90°, the Z-axis and Y-axis acceleration values are 0; and if the included angles formed by the X-axis and Y-axis directions and the direction of gravitational acceleration are greater than 90°, the Z-axis and Y-axis acceleration values are positive.

The second turnover direction determining unit includes:

a horizontal direction determining subunit configured to, if the average value of the first half of the X-axis acceleration data is negative, the average value of the second half is positive, and the absolute value of the difference between the two average values of the X-axis acceleration data is greater than a specified threshold, and if the average value of the first half of the Y-axis acceleration data is positive, the average value of the second half is negative, and the absolute value of the difference between the two average values of the Y-axis acceleration data is greater than the specified threshold, determine that the wrist turning action is turning to the horizontal direction parallel to the ground; and a vertical direction determining subunit configured to, if the average value of the first half of the X-axis acceleration data is positive, the average value of the second half is negative, and the absolute value of the difference between the two average values of the X-axis acceleration data is greater than the specified threshold, and if the average value of the first half of the Y-axis acceleration data is negative, the average value of the second half is positive, and the absolute value of the difference between the two average values of the Y-axis acceleration data is greater than the specified threshold, determine that the wrist turning action is turning to the vertical direction perpendicular to the ground.

For an implementation process of functions and effects of modules in the foregoing display apparatus, please refer to an implementation process of corresponding steps in the foregoing display method for details, which are not described herein again.

Because the apparatus implementations basically correspond to the method implementations, for related parts, reference may be made to a part of the description in the method implementations. The apparatus implementations described above are merely example. The modules described as separate parts may or may not be physically separate, and parts displayed as modules may or may not be physical modules, i.e., may be located in one position, or may be distributed on a plurality of network modules. Some or all of the modules may be selected according to actual requirements to achieve the objectives of the solutions of the present disclosure. A person of ordinary skill in the art may understand and implement the implementations of the present invention without involving creative efforts.

Accordingly, the present disclosure also provides a wearable device, including:

a processor;

a storage configured to store instructions executable by the processor; and an inertial sensor and at least two screen display areas; wherein the inertial sensor is configured to collect measurement data; and the processor is configured to perform operations in the foregoing display method.

Figure 14:
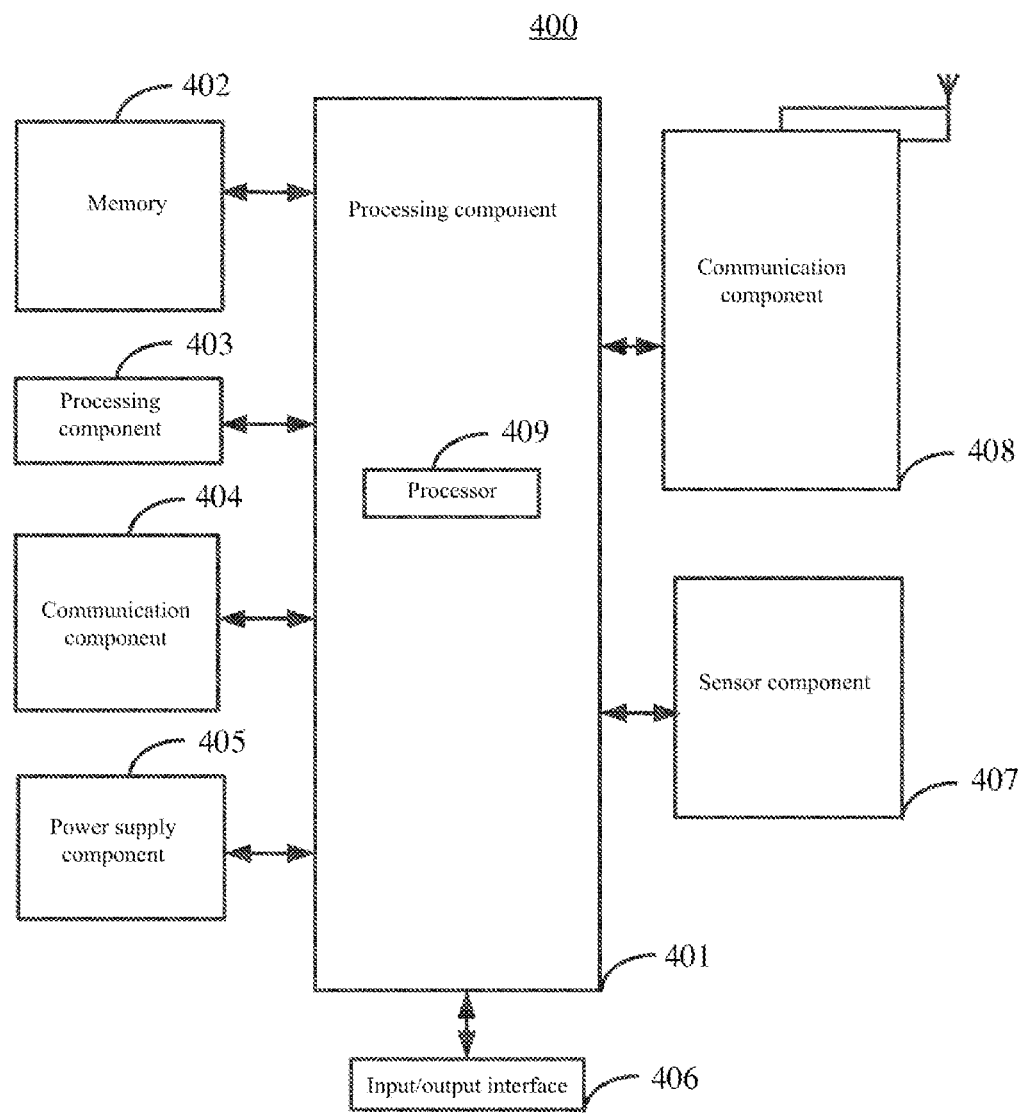
FIG. 14 is an architecture diagram of a wearable device according to an example embodiment of the present disclosure.

FIG. 14 is a schematic structural diagram of a wearable device to which a display apparatus is applied according to an example implementation.

A shown in FIG. 14, a wearable device 400 according to an example implementation is shown. The wearable device 400 may be a wearable device such as a bracelet, a watch, a wristband, or a finger ring.

Referring to FIG. 4, the wearable device 400 may include one or more of the following components: a processing component 401, a storage 402, a power supply component 403, a multimedia component 404, an audio component 405, an Input/Output (I/O) interface 406, a sensor component 407, and a communication component 408.

The processing component 401 generally controls overall operations of the apparatus 400, such as operations associated with display, telephone calls, data communications, camera operations, and recording operations. The processing component 401 may include one or more processors 409 to execute instructions to implement all or some of the steps of the foregoing method. In addition, the processing component 401 may include one or more modules to facilitate interaction between the processing component 401 and other components. For example, the processing component 401 may include a multimedia module to facilitate interaction between the multimedia component 404 and the processing component 401.

The storage 402 is configured to store various types of data to support operations on the electronic device 400. Examples of the data include instructions for any application program or method operated on the wearable device 400, contact data, contact list data, messages, pictures, videos, and the like. The storage 402 may be implemented by any type of volatile or non-volatile storage device, or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk, or an optical disk.

The power supply component 403 provides power for various components of the wearable device 400. The power supply component 403 may include a power management system, one or more power supplies, and other components associated with power generation, management, and distribution for the wearable device 400.

The multimedia component 404 includes a screen that provides an output interface between the wearable device 400 and a user. In some implementations, the screen may include a Liquid Crystal Display (LCD) and a Touch Panel (TP). If the screen includes a TP, the screen may be implemented as a touch screen to receive input signals from the user. The TP includes one or more touch sensors to sense touches, swipes, and gestures on the TP. The touch sensor may not only sense the boundary of a touch or swipe action, but also detect the duration and pressure related to the touch or swipe operation. In some implementations, the multimedia component 404 includes a front camera and/or a rear camera. When the wearable device 400 is in an operation mode, such as, a photographing mode or a video mode, the front camera and/or the rear camera may receive external multimedia data. Each of the front camera and the rear camera may be a fixed optical lens system, or have focus and optical zoom capability.

The audio component 405 is configured to output and/or input an audio signal. For example, the audio component 405 includes a microphone (MIC), and when the wearable device 400 is in an operation mode, such as a calling mode, a recording mode, and a voice recognition mode, the microphone is configured to receive an external audio signal. The received audio signal may be further stored in the storage 402 or transmitted by means of the communication component 408. In some implementations, the audio component 405 further includes a speaker for outputting the audio signal.

The I/O interface 406 provides an interface between the processing component 401 and a peripheral interface module, which may be a keyboard, a click wheel, a button, or the like. The button may include, but is not limited to, a home button, a volume button, a start button, and a lock button.

The sensor component 407 includes one or more sensors for providing state assessment in various aspects for the wearable device 400. For example, the sensor component 407 may detect an on/off state of the wearable device 400, and relative positioning of components. For example, the components are the display and keypad of the wearable device 400. The sensor component 407 may further detect a position change of the wearable device 400 or a component of the wearable device 400, the presence or absence of contact of the user with the wearable device 400, the orientation or acceleration/deceleration of the wearable device 400, and a temperature change of the wearable device 400. The sensor component 407 may include a proximity sensor, which is configured to detect the presence of a nearby object without any physical contact. The sensor component 407 may further include a light sensor, such as a CMOS or CCD image sensor, for use in an imaging application. In some implementations, the sensor component 407 may further include an acceleration sensor, a gyroscope sensor, a magnetic sensor, a pressure sensor, a heart rate signal sensor, an electrocardiography sensor, a fingerprint sensor, or a temperature sensor.

The communication component 408 is configured to facilitate wired or wireless communications between the wearable device 400 and other devices. The wearable device 400 may access a wireless network based on a communication standard, such as WiFi, 2G, or 3G, or a combination thereof. In one example implementation, the communication component 408 receives a broadcast signal or broadcast-related information from an external broadcast management system by means of a broadcast channel. In one example implementation, the communication component 408 further includes a Near Field Communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In an example implementation, the wearable device 400 may be implemented by one or more Application-Specific Integrated Circuits (ASICs), Digital Signal Processors (DSPs), Digital Signal Processing Devices (DSPDs), Programmable Logic Devices (PLDs), Field-Programmable Gate Arrays (FPGAs), controllers, microcontrollers, microprocessors, or other electronic elements, to execute the foregoing method.

In an example implementation, a non-transitory computer-readable storage medium including instructions is also provided, such as a storage 402 including instructions. The instructions are executable by the processor 409 of the wearable device 400 to implement the foregoing method. For example, the non-transitory computer-readable storage medium may be a ROM, a random access memory (RAM), a CD-ROM, a magnetic tape, a floppy disk, an optical data storage device, and the like.

The instructions in the storage medium are executed by the processor 409, and the device 400 is enabled to perform the foregoing display method.

Other implementations of the present disclosure will be apparent to a person skilled in the art from consideration of the specification and practice of the invention disclosed herein. The present disclosure is intended to cover any variations, functions, or adaptive changes of the present disclosure. These variations, uses, or adaptive changes comply with general principles of the present disclosure, and include common knowledge or a customary technical means in the technical field that is not disclosed in the present disclosure. The specification and the implementations are merely considered to be examples, and the actual scope and spirit of the present disclosure are pointed out by the following claims.

It should be understood that the present disclosure is not limited to the exact structure that has been described above and illustrated in the accompanying drawings, and that various modifications and changes can be made without departing from the scope thereof. The scope of the present disclosure is only defined by the appended claims.

The above descriptions are merely example implementations of the present disclosure, but are not intended to limit the present disclosure. Any modification, equivalent replacement, or improvement made without departing from the spirit and principle of the present disclosure shall fall within the protection scope of the present disclosure.

What is claimed is:

1. A display method for a wearable device comprising an inertial sensor and at least two screen display areas,
the display method comprising:
obtaining a target action of a user based on measurement data collected by the inertial sensor;
determining a target screen display area of the at least two screen display areas corresponding to a sight range of the user according to the target action of the user; and
turning on lighting of the target screen display area of the at least two screen display areas corresponding to the sight range of the user to display current content,
wherein when the user wears the wearable device, the at least two screen display areas are not located on the same plane simultaneously.

2. The display method according to claim 1, wherein the measurement data comprises acceleration data and angular velocity data in three axis directions in a three-dimensional coordinate system, wherein the acceleration data comprises X-axis acceleration data, Y-axis acceleration data, and Z-axis acceleration data, and the angular velocity data comprises X-axis angular velocity data, Y-axis angular velocity data, and Z-axis angular velocity data.

3. The display method according to claim 2, wherein the obtaining the target action of the user based on measurement data collected by the inertial sensor comprises:
obtaining a wrist raising action of the user according to the acceleration data in the three axis directions in the three-dimensional coordinate system measured by the inertial sensor.

4. The display method according to claim 3, wherein the determining the target screen display area of the at least two screen display areas corresponding to the sight range of the user according to the target action of the user comprises:
determining a direction of the wrist raising action according to the Z-axis acceleration data or the Y-axis angular velocity data to determine the target screen display area of the at least two screen display areas corresponding to the sight range of the user.

5. The display method according to claim 3, wherein the obtaining the wrist raising action of the user according to the acceleration data in the three axis directions in the three-dimensional coordinate system measured by the inertial sensor comprises:
calculating an acceleration modulus value according to the acceleration data in the three axis directions in the three-dimensional coordinate system measured by the inertial sensor to determine the wrist raising action, the acceleration modulus value being $M^{th}$ power of a sum of $N^{th}$ power of the acceleration data in the three axis directions, and M and N being not equal to 0.

6. The display method according to claim 1, wherein the obtaining the target action of the user based on measurement data collected by the inertial sensor comprises:
obtaining a wrist turnover action of the user based on X-axis angular velocity data in a three-dimensional coordinate system measured by the inertial sensor.

7. The display method according to claim 6, wherein the obtaining the wrist turnover action of the user based on the X-axis angular velocity data in the three-dimensional coordinate system measured by the inertial sensor comprises:
in response to the X-axis angular velocity data in the three-dimensional coordinate system measured by the inertial sensor being greater than a specified threshold, determining the wrist turnover action.

8. The display method according to claim 6, wherein the determining the target screen display area of the at least two screen display areas corresponding to the sight range of the user according to the target action of the user comprises:
determining a turnover direction of the wrist turnover action according to Z-axis acceleration data to determine the target screen display area of the at least two screen display areas corresponding to the sight range of the user.

9. The display method according to claim 8, wherein the determining the turnover direction of the wrist turnover action according to the Z-axis acceleration data comprises:
obtaining the Z-axis acceleration data within a preset time period;
calculating an average value of a first half of the Z-axis acceleration data and an average value of a second half of the Z-axis acceleration data in the preset time period; and
determining the turnover direction of the wrist turnover action according to signs of the average value of the first half of the Z-axis acceleration data and the average value of the second half of the Z-axis acceleration data, and a magnitude relation between a difference of the two average values and a preset threshold, wherein the signs of the average value of the first half and the average value of the second half of the Z-axis acceleration are related to a value of an included angle formed by a Z-axis direction and a direction of gravitational acceleration.

10. The display method according to claim 9, wherein
the determining the turnover direction of the wrist turnover action according to signs of the average value of the first half of the Z-axis acceleration data and the average value of the second half of the Z-axis acceleration data, and the magnitude relation between the difference of the two average values and a preset threshold comprises:
in response to the average value of the first half of the Z-axis acceleration data being positive, the average value of the second half being negative, and an absolute difference value between the first half and the second half being greater than the preset threshold, determining that the wrist turnover action is turning to a direction in which the palm of the user faces down; and
in response to the average value of the first half of the Z-axis acceleration data being negative, the average value of the second half being positive, and the absolute difference value between the first half and the second half being greater than the preset threshold, determining that the wrist turnover action is turning to a direction in which the palm of the user faces up.

11. The display method according to claim 2, further comprising:
determining a display direction of the current content according to the target action, the display direction being a horizontal direction or a vertical direction; and
adjusting the current content based on the display direction.

12. The display method according to claim 11, wherein the obtaining the target action of the user based on measurement data collected by the inertial sensor comprises:

obtaining a wrist turning action of the user according to the Z-axis angular velocity data in the three-dimensional coordinate system measured by the inertial sensor.

13. The display method according to claim 12, wherein the obtaining the wrist turning action of the user according to Z-axis angular velocity data in the three-dimensional coordinate system measured by the inertial sensor comprises:
in response to the Z-axis angular velocity data in the three-dimensional coordinate system measured by the inertial sensor being greater than a preset threshold, determining the wrist turning action.

14. The display method according to claim 12, wherein the determining the display direction of the current content according to the target action comprises:
determining a direction of the wrist turning action according to the X-axis acceleration data and the Y-axis acceleration data to determine the display direction of the current content.

15. The display method according to claim 14, wherein the determining the direction of the wrist turning action according to the X-axis acceleration data and the Y-axis acceleration data comprises:
obtaining the X-axis acceleration data and the Y-axis acceleration data within a preset time period;
respectively calculating average values of first halves and average values of second halves of the X-axis acceleration data and the Y-axis acceleration data in the preset time period; and
determining the direction of the wrist turning action according to signs of the average values of the first halves and the average values of the second halves of the X-axis acceleration data and the Y-axis acceleration data, a magnitude relation between a difference of the two average values of the X-axis acceleration data and a preset threshold, and a magnitude relation between a difference of the two average values of the Y-axis acceleration data and the preset threshold, wherein the signs of the average value of the first half and the average value of the second half of the X-axis acceleration are related to a value of an included angle formed by an X-axis direction and a direction of gravitational acceleration, and the signs of the average value of the first half and the average value of the second half of the Y-axis acceleration are related to a value of an included angle formed by a Y-axis direction and the direction of gravitational acceleration.

16. The display method according to claim 15,
wherein the determining the direction of the wrist turning action according to signs of the average values of the first halves and the average values of the second halves of the X-axis acceleration data and the Y-axis acceleration data, the magnitude relation between the difference between the two average values of the X-axis acceleration data and a preset threshold, and the magnitude relation between the difference between the two average values of the Y-axis acceleration data and the preset threshold comprises:
in case that the average value of the first half of the X-axis acceleration data is negative, the average value of the second half is positive, and an absolute value of the difference between the two average values of the X-axis acceleration data is greater than a specified threshold, and in cast that the average value of the first half of the Y-axis acceleration data is positive, the average value of the second half is negative, and an absolute value of the difference between the two average values of the Y-axis acceleration data is greater than the specified threshold, determining that the wrist turning action is turning to the horizontal direction parallel to the ground; and
in case that the average value of the first half of the X-axis acceleration data is positive, the average value of the second half is negative, and an absolute value of the difference between the two average values of the X-axis acceleration data is greater than the specified threshold, and in case that the average value of the first half of the Y-axis acceleration data is negative, the average value of the second half is positive, and an absolute value of the difference between the two average values of the Y-axis acceleration data is greater than the specified threshold, determining that the wrist turning action is turning to the vertical direction perpendicular to the ground.

17. The display method according to claim 1, wherein the wearable device further comprises an electromyography sensor; and
the turning on lighting of the target screen display area of the at least two screen display areas to display the current content comprises:
in response to the data collected by the electromyography sensor meeting a preset condition, turning on lighting of the target screen display area of the at least two screen display areas to display the current content, the preset condition comprising data indicative that a current action of the user is a clenching action.

18. A wearable device, comprising:
a processor;
a storage configured to store instructions executable by the processor; and
an inertial sensor and at least two screen display areas; wherein
the inertial sensor is configured to collect measurement data; and
the processor is configured to perform the display method according to claim 1.

19. The wearable device of claim 18, wherein the measurement data comprises acceleration data and angular velocity data in three axis directions in a three-dimensional coordinate system, wherein the acceleration data comprises X-axis acceleration data, Y-axis acceleration data, and Z-axis acceleration data, and the angular velocity data comprises X-axis angular velocity data, Y-axis angular velocity data, and Z-axis angular velocity data,
wherein the obtaining the target action of the user based on measurement data collected by the inertial sensor comprises:
obtaining a wrist raising action of the user according to the acceleration data in the three axis directions in the three-dimensional coordinate system measured by the inertial sensor.

20. A non-transitory computer-readable storage medium having a computer program stored thereon, which, when executed by one or more processors, causes the processors to perform the display method according to claim 1.

* * * * *